(12) United States Patent
Segawa et al.

(10) Patent No.: US 6,907,068 B2
(45) Date of Patent: Jun. 14, 2005

(54) IMAGE COMPRESSING CODING APPARATUS AND METHOD FOR DETECTING A TOP POSITION OF AN IMAGE IN A BUFFER OVERFLOW

(75) Inventors: Hiroshi Segawa, Chiyoda-ku (JP); Satoshi Kumaki, Chiyoda-ku (JP); Yoshinori Matsuura, Chiyoda-ku (JP)

(73) Assignee: Renesas Technology Corp., Tokyo (JP)

( * ) Notice: Subject to any disclaimer, the term of this patent is extended or adjusted under 35 U.S.C. 154(b) by 679 days.

(21) Appl. No.: 09/922,695

(22) Filed: Aug. 7, 2001

(65) Prior Publication Data
US 2002/0101923 A1 Aug. 1, 2002

(30) Foreign Application Priority Data
Jan. 29, 2001 (JP) ......................................... 2001-019470

(51) Int. Cl.⁷ .............................................. H04N 7/12
(52) U.S. Cl. ................................................ 375/240.01
(58) Field of Search ....................... 375/240.01, 240.12, 375/240.21, 240.24, 240.26, 240.27, 240.02; 382/232, 235, 236, 238; H04N 7/12

(56) References Cited

FOREIGN PATENT DOCUMENTS

JP 7-135659 5/1995

OTHER PUBLICATIONS

M. Ikeda, et al., IEEE Micro, pp. 56–65, "MPEG–2 Video Encoder Chip," Jul.–Aug. 1999.

*Primary Examiner*—Young Lee
(74) *Attorney, Agent, or Firm*—Oblon, Spivak, McClelland, Maier & Neustadt, P.C.

(57) ABSTRACT

To provide an image compression coding apparatus and method capable of minimizing a deterioration in picture quality which is caused on a reproduced image during an overflow of an output buffer. A picture top detector (7A) executes a picture top detection processing for discarding image compression data (S2) until a top of a picture of the image compression data (S2) is detected during detection of a start address, and restarts a normal operation after detecting the top of the picture. A processor (5) brings a detection start register (8) into a set state and causes the picture top detector (7A) to execute the picture top detection processing during an overflow of an output buffer (3a), and executes an interruption processing of rewriting, as a value of a write address register (9), an address where a top of an overflow picture to be a picture causing the overflow is stored.

20 Claims, 17 Drawing Sheets

IMAGE COMPRESSING CODING APPARATUS AND METHOD FOR DETECTING A TOP POSITION OF AN IMAGE IN A BUFFER OVERFLOW

BACKGROUND OF THE INVENTION

1. Field of the Invention

The present invention relates to an image compression coding apparatus and method for compressing and coding input image data such as a dynamic image.

2. Description of the Background Art

Currently, an MPEG 2 has been a core technique of AV equipment as an international standard for an image compression technology. Various image compressing methods such as TV telephone/conference H. 261 (a recommendation number determined by ITU-T) or an MPEG (Moving Picture Experts Group) 1 which is an antecedent of the MPEG 2 as well as the MPEG 2 have been investigated and standardized.

An image compression coding apparatus using these image compression methods has an output buffer having a comparatively large capacity in an output stage of image compression data output from an image compressor. The output buffer is provided to absorb a difference in a data transfer rate made between the image compression coding apparatus and output side means of a communication path connected to the output side thereof.

For example, in the case in which a digital telephone line is connected as the output side means to the image compression coding apparatus for a TV telephone, a data transfer rate of the telephone line is always 64 kbps, for example, and a data volume of image compression data per unit time which are generated by the image compression coding apparatus is always changed depending on the complexity of the input image data. For example, the image compression data for one screen obtained every 1/30 second are varied depending on the data volume of the input image data.

More specifically, in the case in which the input image data define complicated image contents, the data volume of the image compression data themselves is also increased so that the data transfer rate of the image compression data is increased. To the contrary, in the case in which the input image data define simple image contents, the data volume of the image compression data themselves is reduced so that the data transfer rate of the image compression data is decreased.

At this time, the image compressor for outputting the image compression data is controlled such that a mean data transfer rate of output image compression data output from the image compression coding apparatus is 64 kbps. A fluctuation in the data transfer rate of the image compression data can be buffered through an output buffer provided between the image compression coding apparatus and the telephone line.

Thus, the control of the coding quantity through the image compressor which is to be carried out to average the data transfer quantity of the image compression data to a predetermined bit rate in the image compressor is referred to as "rate control".

In the case of MP ML (Main Profile at Main Level) of the MPEG 2 standard, the output buffer has a size of 1,835 Mbit defined. However, there is a problem in that the output buffer should be fully utilized for the rate control to enhance the whole picture quality.

For example, a data volume which is as large as possible is assigned as the data volume of the image compression data to a complicated image and a data volume which is as small as possible is assigned as the data volume of the image compression data to a simple image. Consequently, the wholly average picture quality can be enhanced.

Depending on the control contents of the rate control, however, the output buffer overflows so that a part of the image compression data are lacked in some cases. For example, when complicated input image data are input continuously, the filling quantity of the output buffer (the storage quantity of unoutput image compression data) is increased so that a residual quantity is decreased. However, image compression data having a large data volume are continuously transferred to the output buffer. Therefore, there is a higher possibility that the output buffer might overflow.

FIG. 20 is a block diagram showing an example of a structure of a conventional image compression coding apparatus. As shown in FIG. 20, an image compressor 22 receives input image data S21 obtained through an image input terminal 21, compresses and codes the input image data S21 and outputs image compression data S22 to an output buffer 23.

The output buffer 23 sequentially fetches and temporarily stores the image compression data S22 and outputs the image compression data S22 as output image compression data S23 to an image data output terminal 24 by an FIFO (first-in first-out) method. The output buffer 23 is constituted by an FIFO memory for outputting input data by the FIFO method while changing a read address (an address for reading written data) and a write address (an address for newly writing data).

The output buffer 23 has a full flag terminal FF for outputting a full flag signal SF. The full flag signal SF is brought into an active state during an overflow in which the buffer filling quantity is full. The full flag signal SF is input to an interruption terminal INT of a processor 25 which will be described later.

When the full flag signal SF is brought into the active state, the processor 25 writes, to a reset register 27, a reset value indicative of reset execution for the reset register 27 through an external bus 26.

The image compressor 22 and the output buffer 23 can read the reset value stored in the reset register 27 through a reset terminal RST, respectively. In the case in which the reset value is indicative of the reset execution, a reset processing of initializing respective contents and carrying out restarting is executed.

With such a structure, when the input image data S21 defining complicated image contents are continuously input, a rate at which the image compression data S22 are to be input to the output buffer 23 exceeds a rate at which the output image compression data S23 are output from the output buffer 23. Therefore, the filling quantity of the output buffer 23 is increased. When such a state continues, the filling quantity of the output buffer 23 becomes full (overflows).

When the output buffer 23 overflows, the full flag signal SF set in the active state is output from the output buffer 23 and is given to the interruption terminal INT of the processor 25.

FIG. 21 is a flow chart showing an operation of the processor 25 which is carried out during the overflow of the output buffer 23.

As shown in FIG. 21, at Step S201, a reset value indicative of reset execution is written to the reset register 27 and a processing is ended.

Then, the image compressor 22 stops a compression processing which is being executed and executes a reset processing and restarts the compression processing for the input image data S21 newly input after the reset processing, and the output buffer 23 executes the reset processing of setting the current filling quantity to "0" (for discarding the image compression data S22 which are being stored) and buffers, by the FIFO method, the image compression data S22 newly input after the reset processing.

Thus, the conventional image compression coding apparatus executes the reset processing of the image compressor 22 and the output buffer 23 when the output buffer 23 overflows.

However, the reset processing requires a comparatively long time until a normal image compression coding processing is restarted after the reset processing. In the meantime, therefore, the input image data S21 to be input to the image compressor 22, the image compression data S22 which are being compressed by the image compressor 22 during the reset and correspond to data discarded by the reset processing, and the output image compression data S23 which are filled in the output buffer 23 during the reset in such a state that the image compression data S22 discarded by the reset processing are lacked.

As a result, there has been a problem in that the picture quality of an image to be reproduced based on the output image compression data S23 is deteriorated. For example, in the case in which one second is required before the compression coding processing is restarted after the reset processing, the image compression data S22 for one second+α (a data volume lacked in the image compressor 22 and the output buffer 23) are lacked.

SUMMARY OF THE INVENTION

A first aspect of the present invention is directed to an image compression coding apparatus comprising an image compressor for compressing input image data to output image compression data constituted by a plurality of subdivided data, an overflow detector for detecting that an output buffer for temporarily storing data generates an overflow or not, a subdivided data top detector connected to the image compressor and the output buffer, for serving to carry out a normal operation for exactly giving the image compression data to the output buffer and a detecting operation for detecting a top position of the subdivided data from the image compression data to give the image compression data to the output buffer from the subdivided data of which top position is detected, and control means connected such that a result of detection of the overflow detector can be recognized, for serving to cause the subdivided data top detector to execute the detecting operation when an overflow is detected by the overflow detector and to set, as a value of a register indicative of a write destination of the output buffer, an address where a top of the subdivided data a part of which cannot be written to the output buffer is written.

A second aspect of the present invention is directed to the image compression coding apparatus according to the first aspect of the present invention, wherein the subdivided data include a picture to be a processing unit treated by an MPEG, the subdivided data top detector includes a picture top detector for giving the image compression data, to the output buffer, from a picture of which top position is first detected during the detecting operation.

A third aspect of the present invention is directed to the image compression coding apparatus according to the first aspect of the present invention, wherein the subdivided data include a picture to be a processing unit treated by an MPEG, the subdivided data top detector includes a picture top detector for giving the image compression data, to the output buffer, from a picture of which top position is detected at a predetermined numbered time which is two or more in a first mode, and giving the image compression data, to the output buffer, from a picture of which top position is first detected in a second mode during the detecting operation.

A fourth aspect of the present invention is directed to the image compression coding apparatus according to the third aspect of the present invention, wherein the control means sets the first mode if a picture type of an overflow picture to be the picture which cannot be written to the output buffer during the overflow is a predetermined type, and sets the second mode if not so.

A fifth aspect of the present invention is directed to the image compression coding apparatus according to the fourth aspect of the present invention, wherein the predetermined type includes a P picture.

A sixth aspect of the present invention is directed to the image compression coding apparatus according to the fifth aspect of the present invention, wherein the predetermined type includes an I picture.

A seventh aspect of the present invention is directed to the image compression coding apparatus according to the first aspect of the present invention, wherein the subdivided data include a slice to be a processing unit treated by an MPEG which is obtained by further subdividing a picture, the subdivided data top detector includes a slice top detector for detecting a top position of the slice from the image compression data and for giving the image compression data, to the output buffer, from the slice of which top position is detected.

An eighth aspect of the present invention is directed to the image compression coding apparatus according to the first aspect of the present invention, further comprising: a dummy data inserting section provided between the subdivided data top detector and the output buffer and operated under control of the control means and the subdivided data top detector, the dummy data inserting section serving to insert dummy data in the image compression data in place of the subdivided data which cannot be written to the output buffer during the overflow.

A ninth aspect of the present invention is directed to the image compression coding apparatus according to the first aspect of the present invention, further comprising is a dummy data inserting section for receiving the output image compression data and being operated under control of the control means, wherein the subdivided data top detector includes a subdivided data top detector for inserting a dummy insertion mark in the image compression data during the detecting operation, the dummy data inserting section serves to insert dummy data in place of the dummy insertion mark in the output image compression data.

A tenth aspect of the present invention is directed to the image compression coding apparatus according to the eighth aspect of the present invention, wherein the image compressor generates a generation coding quantity to be a bit quantity during compression coding, and the control means normally executes rate control for controlling a coding quantity of the image compressor based on the generation coding quantity generated by the image compressor and executes the rate control based on a data volume of the dummy data during an overflow.

An eleventh aspect of the present invention is directed to an image compression coding method using an image compression coding apparatus comprising an image compressor for compressing input image data into a subdivided data unit and for outputting image compression data, and an output buffer for temporarily storing the image compression data and for outputting the image compression data as output image compression data in a first-in first-out method while changing a write address, the method comprising the steps of (a) returning the write address to an address where the subdivided data which cannot be written to the output buffer during an overflow of the output buffer are to be written when the overflow of the output buffer is generated, and (b) detecting a top position of the subdivided data from the image compression data without giving the image compression data to the output buffer when the overflow of the output buffer is generated, and giving the image compression data again, to the output buffer, from the subdivided data of which top position is detected.

A twelfth aspect of the present invention is directed to the image compression coding method according to the eleventh aspect of the present invention, wherein the subdivided data include a picture to be a processing unit treated by an MPEG, the step (b) includes the step of giving the image compression data, to the output buffer, from a picture of which top position is first detected.

A thirteenth aspect of the present invention is directed to the image compression coding method according to the eleventh aspect of the present invention, wherein the subdivided data include a picture to be a processing unit treated by an MPEG, the step (b) including the steps of (b-1) giving the image compression data, to the output buffer, from a picture of which top position is detected at a predetermined numbered time which is two or more in a first mode, and (b-2) giving the image compression data, to the output buffer, from a picture of which top position is first detected in a second mode.

A fourteenth aspect of the present invention is directed to the image compression coding method according to the thirteenth aspect of the present invention, further comprising the step of (c) setting the first mode if a picture type of an overflow picture to be the picture which cannot be written to the output buffer during the overflow is a predetermined type, and setting the second mode if not so, the step (c) being executed before the step (b).

A fifteenth aspect of the present invention is directed to the image compression coding method according to the fourteenth aspect of the present invention, wherein the predetermined type includes a P picture.

A sixteenth aspect of the present invention is directed to the image compression coding method according to the fifteenth aspect of the present invention, wherein the predetermined type includes an I picture.

A seventeenth aspect of the present invention is directed to the image compression coding method according to the eleventh aspect of the present invention, wherein the subdivided data include a slice to be a processing unit treated by an MPEG which is obtained by further subdividing a picture, the step (b) including the step of detecting a top position of the slice from the image compression data and for giving the image compression data, to the output buffer, from the slice of which top position is detected.

An eighteenth aspect of the present invention is directed to the image compression coding method according to the eleventh aspect of the present invention, further comprising the step of (d) inserting dummy data in the image compression data in place of the subdivided data which cannot be written to the output buffer during the overflow when the overflow is generated, and giving the image compression data to the output buffer.

A nineteenth aspect of the present invention is directed to the image compression coding method according to the eleventh aspect of the present invention, wherein the step (b) includes the step of inserting a dummy insertion mark in the image compression data, the method further comprising the step of (d) receiving the output image compression data from the output buffer and inserting dummy data in place of a dummy insertion mark in the output image compression data.

A twentieth aspect of the present invention is directed to the image compression coding method according to the eighteenth aspect of the present invention, further comprising the steps of (e) normally controlling a generation coding quantity to be a bit quantity generated during compression coding in the image compressor, thereby executing rate control, and (f) executing the rate control based on a data volume of the dummy data when the overflow is generated.

According to the first aspect of the present invention, as described above, the image compression data are given, to the output buffer, from the subdivided data of which top position is detected by the subdivided data top detector during the overflow of the output buffer, and the address where the top in the overflow subdivided data to be the subdivided data a part of which cannot be written to the output buffer is written is set as the value of the register indicative of the write destination of the output buffer through the control means.

Accordingly, when the overflow detector detects the overflow of the output buffer, the overflow subdivided data remaining in the output buffer can be erased, the overflow subdivided data remaining in the image compression data can be discarded and the image compression data can be input, to the output buffer, from the subdivided data of which top position is newly detected.

As a result, the image compression data are discarded on a subdivided data unit during the overflow. Consequently, it is possible to obtain an image of high picture quality during reproduction based on the output image compression data.

Also when the overflow is generated, moreover, a reset processing such as initialization of the contents of the processings of the image compressor and the output buffer is not carried out. Therefore, it is possible to shorten a return time after the overflow.

According to the second aspect of the present invention, the image compression data are discarded on one picture unit during the overflow. Consequently, it is possible to obtain an image of high picture quality during reproduction based on the output image compression data.

According to the third aspect of the present invention, the image compression data are discarded on one picture unit or on a predetermined number of picture units which is two or more during the overflow. Consequently, it is possible to obtain an image of high picture quality during reproduction based on the output image compression data.

According to the fourth aspect of the present invention, it is possible to change the number of pictures to be discarded depending on whether the picture type of the overflow picture is a predetermined type or not.

According to the fifth aspect of the present invention, when the picture type is the P picture, the picture is discarded on a predetermined number of picture units. Consequently, it is possible to output the output image compression data which do not greatly depart from a circulation rule based on the P picture also during the overflow if the predetermined number is set to a proper value.

According to the sixth aspect of the present invention, when the picture type is the I picture, the picture is discarded on a predetermined number of picture units. Consequently, it is possible to output the output image compression data which do not greatly depart from a circulation rule based on the I picture also during the overflow if the predetermined number is set to a proper value.

According to the seventh aspect of the present invention, the image compression data are discarded on a slice unit which is obtained by further subdividing the picture during the overflow. Therefore, it is also possible to output the output image compression data without changing the number of pictures during the generation of the overflow.

According to the eighth aspect of the present invention, the dummy data are inserted in the image compression data in place of the subdivided data which cannot be written to the output buffer during the overflow through the dummy data inserting section provided between the subdivided data top detector and the output buffer. Consequently, it is also possible to output the output image compression data without changing the number of pictures during the generation of the overflow.

In this case, it is possible to reliably prevent the output buffer from overflowing again through the dummy data insertion by using, for the dummy data, the stream data having a comparatively small generation coding quantity such as a black screen.

According to the ninth aspect of the present invention, the dummy data are inserted in place of the dummy insertion mark indicative of an overflow position in the output image compression data through the dummy data inserting section receiving the output image compression data. Consequently, it is also possible to output the output image compression data without changing the number of pictures during the generation of the overflow.

According to the tenth aspect of the present invention, it is also possible to execute the rate control with high precision based on the data volume of the dummy data during the overflow.

According to the eleventh aspect of the present invention, immediately after the overflow of the output buffer, the write address is returned to the address for writing the overflow subdivided data to be the subdivided data which cannot be written to the output buffer at the step (a), and the image compression data are given, to the output buffer, from the subdivided data of which top position is detected after the overflow.

Accordingly, also when the overflow is generated on the output buffer, the overflow subdivided data remaining in the output buffer can be erased, the overflow subdivided data remaining in the image compression data can be discarded and the image compression data can be input, to the output buffer, from the subdivided data of which top position is newly detected.

As a result, the image compression data are discarded on a subdivided data unit during the overflow. Consequently, it is possible to obtain an image of high picture quality during reproduction based on the output image compression data.

Also when the overflow is generated, moreover, a reset processing such as initialization of the contents of the processings of the image compressor and the output buffer is not carried out. Therefore, it is possible to shorten a return time after the overflow.

According to the twelfth aspect of the present invention, the image compression data are discarded on one picture unit during the overflow at the step (b). Consequently, it is possible to obtain an image of high picture quality during reproduction based on the output image compression data.

According to the thirteenth aspect of the present invention, the image compression data are discarded on one picture unit or on a predetermined number of picture units which is two or more during the overflow at the steps (b-1) and (b-2). Consequently, it is possible to obtain an image of high picture quality during reproduction based on the output image compression data.

According to the fourteenth aspect of the present invention, it is possible to change the number of pictures to be discarded depending on whether the picture type of the overflow picture is a predetermined type or not.

According to the fifteenth aspect of the present invention, when the picture type is the P picture, the picture is discarded on a predetermined number of picture units. Consequently, it is possible to output the output image compression data which do not greatly depart from a circulation rule based on the P picture also during the overflow if the predetermined number is set to a proper value.

According to the sixteenth aspect of the present invention, when the picture type is the I picture, the picture is discarded on a predetermined number of picture units. Consequently, it is possible to output the output image compression data which do not greatly depart from a circulation rule based on the I picture also during the overflow if the predetermined number is set to a proper value.

According to the seventeenth aspect of the present invention, the image compression data are discarded on a slice unit which is obtained by further subdividing the picture during the overflow at the step (b). Consequently, it is also possible to output the output image compression data without changing the number of pictures during the generation of the overflow.

According to the eighteenth aspect of the present invention, the dummy data are inserted in the image compression data in place of the subdivided data which cannot be written to the output buffer during the overflow at the step (d). Consequently, it is also possible to output the output image compression data without changing the number of pictures during the generation of the overflow.

In this case, it is possible to reliably prevent the output buffer from overflowing again through the dummy data insertion by using, for the dummy data, the stream data having a comparatively small generation coding quantity such as a black screen.

According to the nineteenth aspect of the present invention, the dummy data are inserted in place of the dummy insertion mark indicative of an overflow position in the output image compression data at the step (d). Consequently, it is also possible to output the output image compression data without changing the number of pictures during the generation of the overflow.

According to the twentieth aspect of the present invention, it is also possible to execute the rate control with high precision based on the data volume of the dummy data during the overflow at the step (e).

In order to solve the above-mentioned problems, it is an object of the present invention to provide an image compression coding apparatus and method capable of minimizing a deterioration in picture quality which is caused on a reproduced image also during the overflow of an output buffer.

DESCRIPTION OF THE PREFERRED EMBODIMENTS

<First Embodiment>

Figure 1:
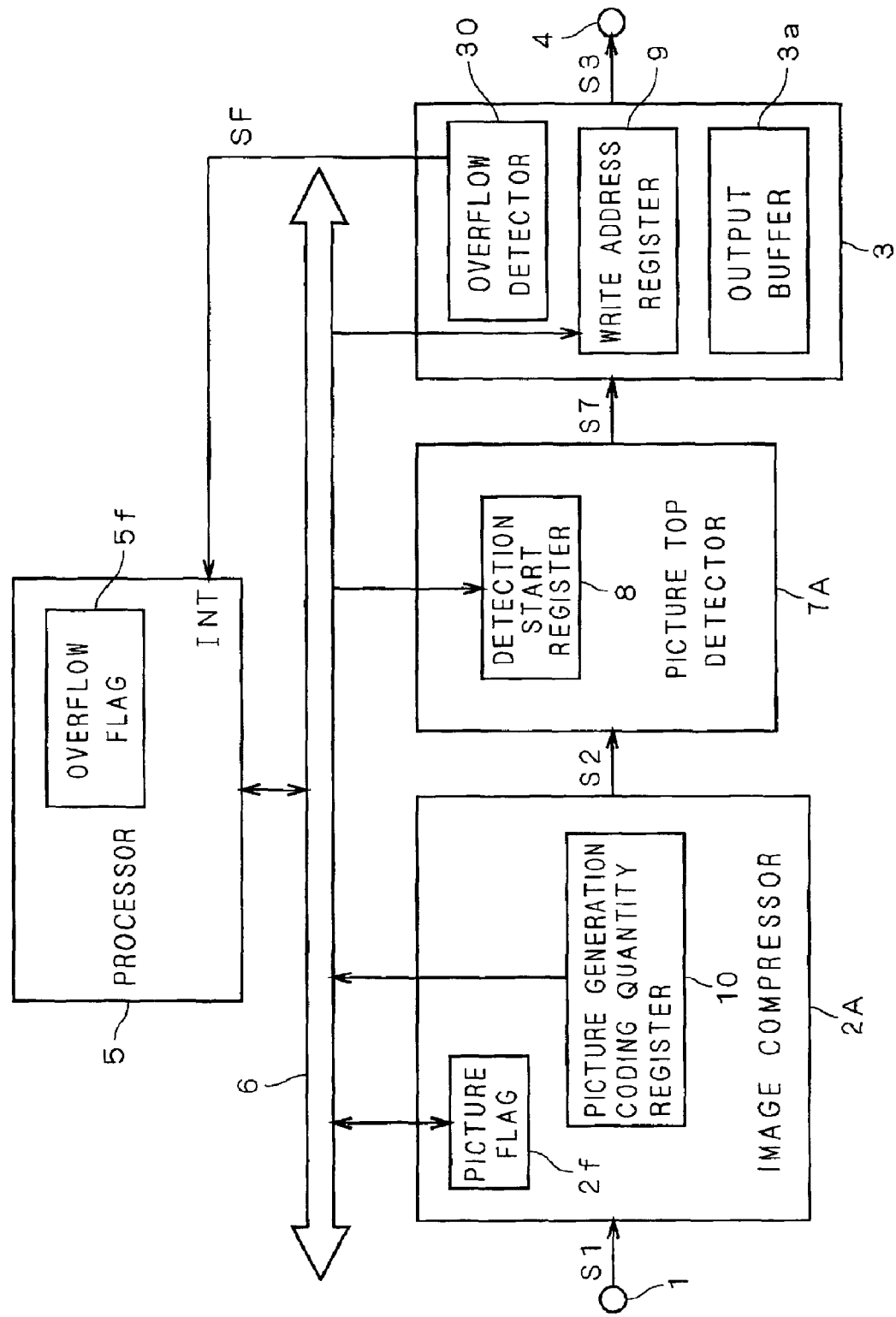
FIG. 1 is a block diagram showing a whole structure of an image compression coding apparatus according to a first embodiment of the present invention.

FIG. 1 is a block diagram showing a structure of an image compression coding apparatus according to a first embodiment of the present invention. As shown in FIG. 1, an image compressor 2A receives input image data S1 obtained through an image input terminal 1, compresses and codes the input image data S1 and outputs image compression data S2 to a picture top detector 7A.

A picture is one of subdivided data obtained by subdividing the input image data S1 and is a processing unit to be treated by an MPEG, and is equivalent to one screen. Usually, a dynamic image is constituted by 30 frames for one second. For example, a picture is defined corresponding to one of the frames in an MPEG 2.

Moreover, the image compressor 2A has a picture flag 2f and a picture generation coding quantity register 10 provided therein. Every time the input image data S1 are fetched for one picture, a coding quantity obtained after an image compression coding processing is written to the picture generation coding quantity register 10 and the picture flag 2f is set.

The picture top detector 7A exactly outputs the image compression data S2 as image compression data S7 to an output buffer section 3 during a normal operation, executes a picture top detection processing for discarding the image compression data S2 until a top of a picture of the image compression data S2 is detected during start address detection in such a state that the stored value of a detection start register 8 is set, and outputs the image compression data S2 as image compression data S7 from a picture of which top position is detected after the detection of the picture top and is then returned to the normal operation.

The output buffer section 3 has an output buffer 3a. The output buffer 3a sequentially fetches and temporarily stores the image compression data S7 and outputs the image compression data S7 as output image compression data S3 to an image data output terminal 4 by an FIFO method. The output buffer 3a is constituted by an FIFO memory for outputting input data by the FIFO method while changing a read address and a write address.

The output buffer section 3 has an overflow detector 30 for outputting a full flag signal SF. The full flag signal SF is brought into an active state during an overflow in which the buffer filling quantity of the output buffer 3a is full. The full flag signal SF is input to an interruption terminal INT of a processor 5 which will be described later.

Moreover, the output buffer 3a writes the image compression data S7 from a write address indicated by the stored value of a write address register 9, and properly updates the stored value of the write address register 9 based on the written contents.

The processor 5 can detect the contents of the picture flag 2f and the picture generation coding quantity register 10 in the image compressor 2A through an external bus 6, and executes a main operation for accumulating the coding quantity stored in the picture generation coding quantity register 10 every time the picture flag 2f is set and for always calculating the newest picture start address in the output buffer 3a based on the accumulated value.

Moreover, when detecting the active state of the full flag signal SF, the processor 5 executes an interruption processing of bringing the stored value of the detection start register 8 in the picture top detector 7A into a set state through an external bus 26 after setting an internal overflow flag 5f.

Figure 2:
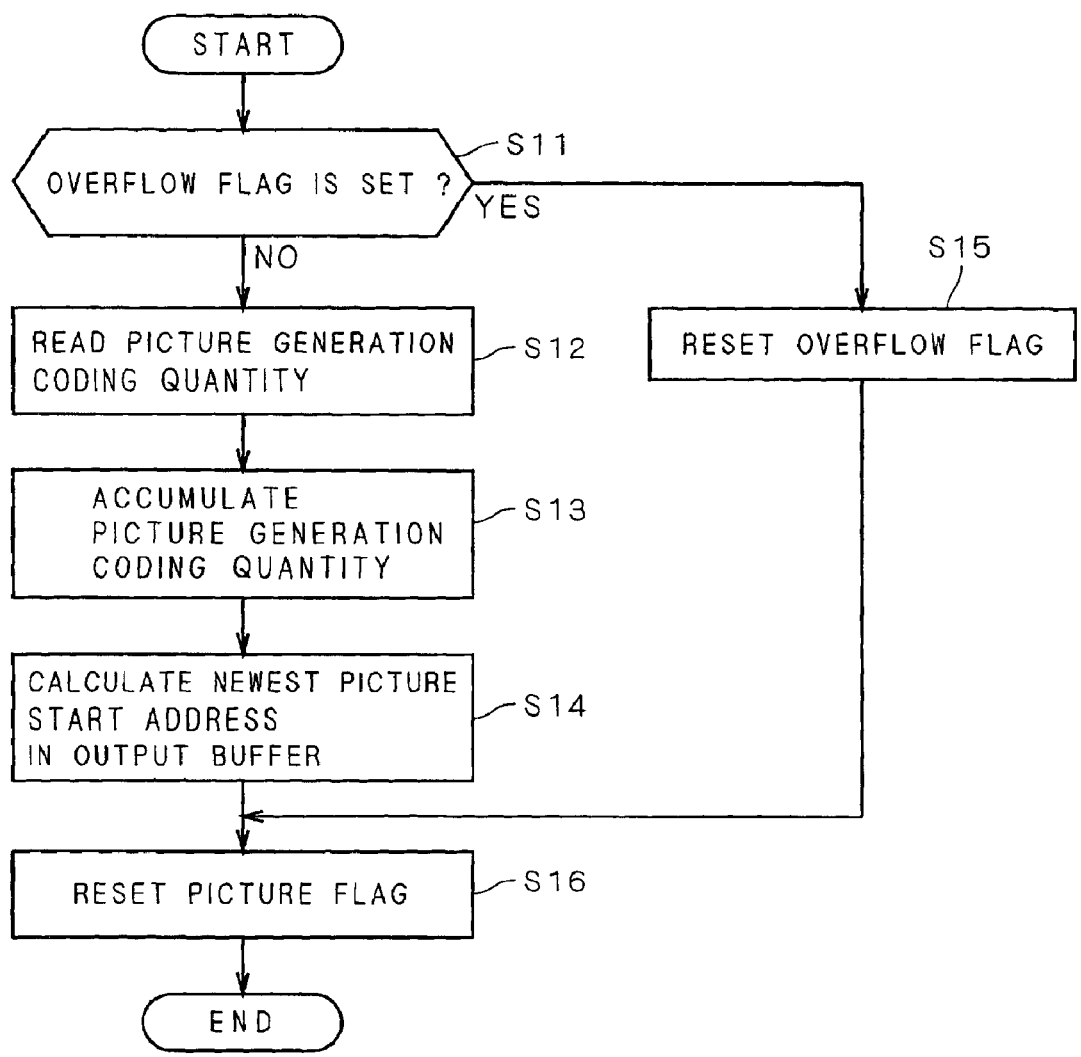
FIG. 2 is a flow chart showing a main operation of a processor according to the first embodiment.

FIG. 2 is a flow chart showing the main operation of the processor 5. As described above, the main operation is executed every time the picture flag 2f in the image compressor 2A is set.

Referring to FIG. 2, it is decided whether the overflow flag 5f is set or not at Step S11. If the overflow flag 5f is not set, the processing proceeds to Step S12. If the overflow flag 5f is set, the overflow flag 5f is reset at Step S15 and the processing then proceeds to Step S16.

A picture generation coding quantity is read from the picture generation coding quantity register 10 through the external bus 6 at the Step S12, and the picture generation coding quantity is accumulated to obtain an accumulated value at Step S13.

At Step S14, then, a data capacity on an address unit of the output buffer 3a is converted based on the accumulated value obtained at the Step S13 and the newest picture start address (a write address of the output buffer 3a to which the top position of a picture is to be written) in the output buffer 3a is calculated.

Thereafter, the picture flag 2f is reset at Step S16 and the processing is ended.

With such a structure, when the input image data S1 defining the complicated image contents are continuously input, a rate at which the image compression data S2 are input to the output buffer section 3a exceeds a rate at which the output image compression data S3 are output from the output buffer section 3. Therefore, the filling quantity of the output buffer 3a is increased. If this state continuous for a long period of time, the filling quantity of the output buffer 3a becomes full (overflows).

When the output buffer 3a overflows, the full flag signal SF in the active state is output from the overflow detector 30 and is given to the interruption terminal INT of the processor 5.

Figure 3:
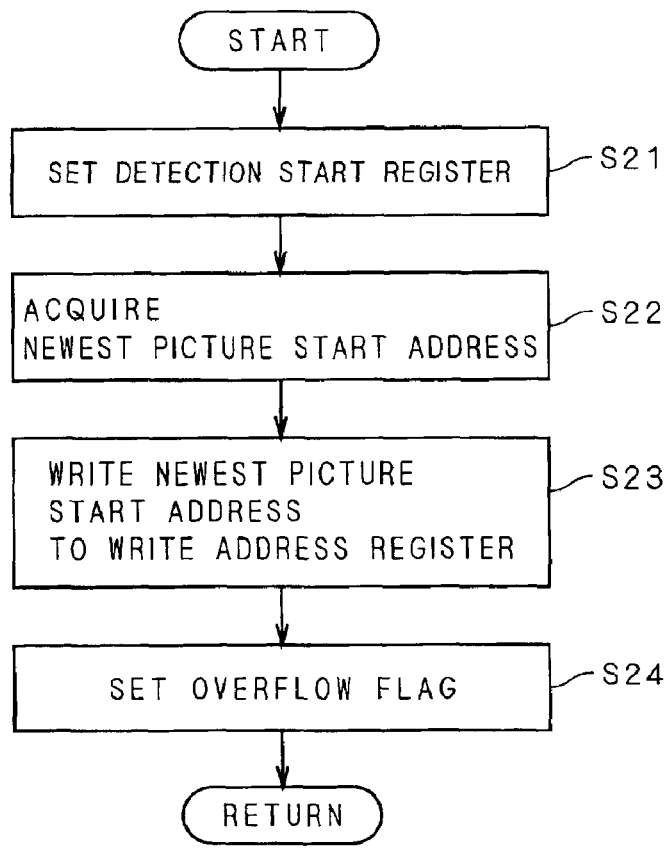
FIG. 3 is a flow chart showing an interrupting operation of the processor according to the first embodiment.

FIG. 3 is a flow chart showing an interruption processing of the processor 5 which is carried out during the overflow of the output buffer 3a (the full flag signal SF is set in the active state).

Referring to FIG. 3, the detection start register 8 is brought into a set state through the external bus 6 at Step S21.

Then, the newest picture start address previously obtained by the main operation is acquired at Step S22 and the newest picture start address is written to the write address register 9 at Step S23.

The image compression coding processing of the image compressor 2A and the processing of writing the image compression data S2 to the output buffer section 3 are carried out almost simultaneously. Therefore, the newest picture start address corresponds to a write address to which the top of an overflow picture to be a picture causing an overflow is written.

More specifically, the stored value of the write address register 9 of the output buffer section 3 is returned to an address in which the top of the overflow picture is stored through the processing of the Step S23. As a result, a part of the overflow picture which has already been written to the output buffer 3a before the overflow is not read from the output buffer 3a but is erased through overwrite.

Then, the overflow flag 5f is set at Step S24 and the interruption processing is ended.

On the other hand, the image compressor 2A also writes the picture generation coding quantity of the overflow picture to the picture generation coding quantity register 10.

As shown in FIG. 2, however, the main operation to be carried out by the processor 5 immediately after the overflow is processed in order of the Steps S11, S15 and S16. Therefore, a picture start address is not calculated based on the overflow picture (the processings of the Steps S12 to S14).

Figure 4:
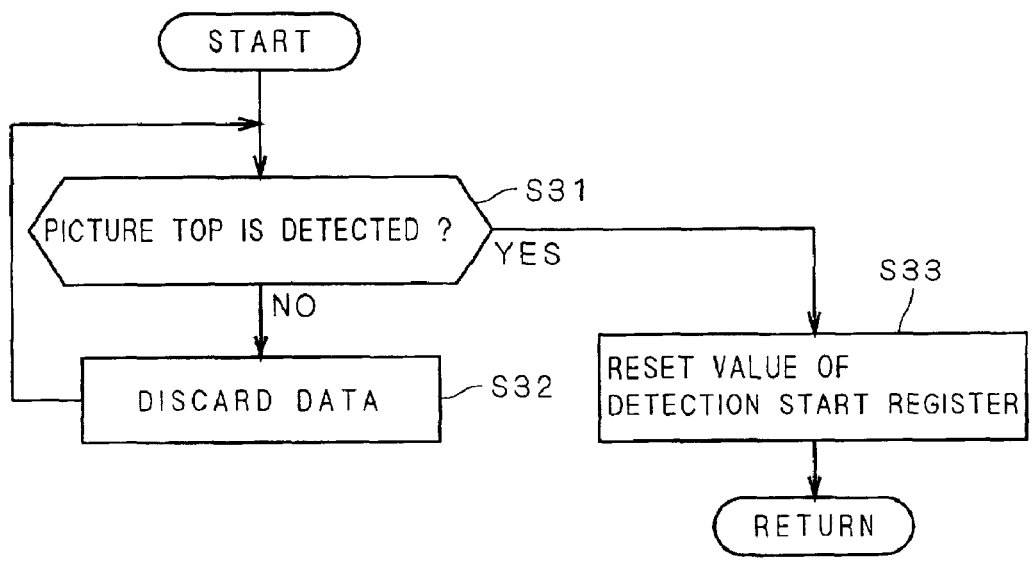
FIG. 4 is a flow chart showing a picture top detecting operation of a picture top detector according to the first embodiment.

FIG. 4 is a flow chart showing the picture top detecting operation of the picture top detector 7A to be executed when the stored value of the detection start register 8 is in the set state.

With reference to FIG. 4, at Step S31, it is decided whether a picture top is detected from the image compression data S2 or not. If the picture top is not detected, the image compression data S2 to be input (that is, the residual data of the overflow picture) are discarded at Step S32, and the processing is then returned to the Step S31. Subsequently, the image compression data S2 are discarded at the Step S32 until the picture top is detected at the Step S31.

When the picture top is detected at the Step S31, the detection start register 8 is brought into a reset state at Step S33 and the processing is ended. As a result, the image compression data S2 are transferred again, to the output buffer section 3, from the picture of which top has been detected.

Subsequently, the picture top detector 7A restarts the normal operation and exactly outputs the image compression data S2 as the image compression data S7 to the output buffer section 3.

The contents of the picture top detection in the picture top detector 7A will be described below. In a bit stream to be the image compression data S2, a 32-bit picture start code is inserted in the top of a picture. By detecting the picture start code, a picture top can be detected.

By the picture top detecting operation of the picture top detector 7A, thus, the image compression data S2 of a picture succeeding to an overflow picture is output as the image compression data S7 from the top address. Moreover, a part of the overflow picture is not continuously output as the image compression data S7 after the overflow.

An image expansion coding apparatus for receiving the output image compression data S3 from the compression image data output terminal 4 through a communication path or the like can continuously carry out an expansion coding processing from the top of a picture again by detecting a picture start code even if a bit stream to be input (the image compression data S2) is cut in the middle during the expansion coding processing.

In the case in which the bit stream (the image compression data S2) is not written to the output buffer 3a but is discarded due to the overflow of the output buffer 3a, the bit stream written to the output buffer 3a immediately before the overflow is cut in the middle of a picture.

Accordingly, in the case in which the bit stream (the output image compression data S3) cut in the middle of a picture is exactly expanded and coded through the image expansion coding apparatus and is thus reproduced into an image (displayed on a screen), the picture cut in the middle is displayed on the screen in such a configuration that the middle of the screen has an abnormality and picture quality is deteriorated remarkably.

In the first embodiment, however, the stored value of the write address register 9 of the output buffer section 3 is returned to an address in which the top of the overflow picture is stored, and the image compression data S2 are discarded until a picture top is newly detected by the picture top detecting operation of the picture top detector 7A through the interruption processing of the processor 5. Consequently, when an overflow is generated, the image compression data S2 are discarded on one picture unit.

In the image compression coding apparatus according to the first embodiment, accordingly, the bit stream cut in the middle of the picture is not output as the output image compression data S3 also after the overflow of the output buffer 3a.

In the image compression coding apparatus according to the first embodiment, consequently, screen display is not carried out in such a configuration that the middle of the screen has an abnormality after the overflow. Thus, a deterioration in picture quality can be minimized.

In addition, it is not necessary to execute a reset operation for initializing the image compressor 2A and the output buffer 3a during the overflow according to the conventional art. Therefore, a return time required after the overflow can be shortened.

<Second Embodiment>

In an MPEG 2 method, there are three kinds of picture types of an I picture, a P picture and a B picture. If the I picture, the P picture and the B picture are referred to as I, P and B respectively, the pictures are regularly circulated like "IBBPBBPBB . . . " in image compression data S2, for example.

The image compression coding apparatus according to the first embodiment serves to discard only an overflow picture during an overflow. Therefore, if the picture is discarded, the regularity is broken.

In particular, when the P picture is discarded, the B picture continues for four screens like "IBBBBPBB", for example. Consequently, there is a drawback that an expansion coding processing for a bit stream (output image compression data S3) in an image expansion coding apparatus becomes complicated. An image compression coding apparatus according to a second embodiment serves to eliminate such a drawback.

Figure 5:
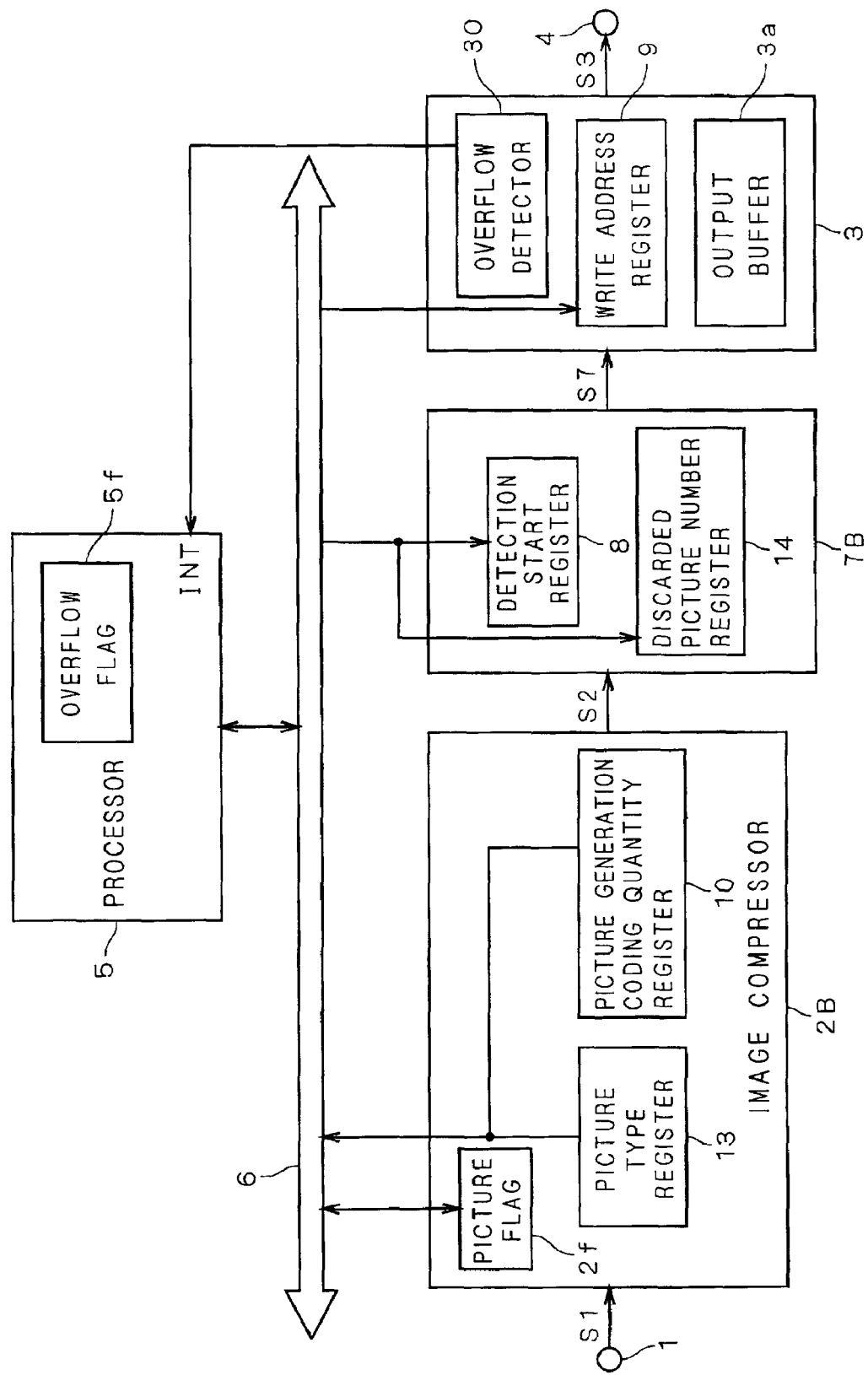
FIG. 5 is a block diagram showing a whole structure of an image compression coding apparatus according to a second embodiment of the present invention.

FIG. 5 is a block diagram showing a structure of the image compression coding apparatus according to the second embodiment of the present invention. As shown in FIG. 5, an image compressor 2B receives input image data S1 obtained through an image input terminal 1, compresses the input image data S1 and outputs image compression data S2 to a picture top detector 7B.

Moreover, the image compressor 2B has a picture flag 2f, a picture generation coding quantity register 10 and a picture type register 13 provided therein. Every time the input image data S1 are fetched for one picture, a coding quantity obtained after an image compression coding processing is written to the picture generation coding quantity register 10, the picture type is written to the picture type register 13 and the picture flag 2f is set.

The picture top detector 7B exactly outputs the image compression data S2 as image compression data S7 to an output buffer section 3 during a normal operation, executes a picture top detection processing for the image compression data S2 which will be described later during start address detection in such a state that the stored value of a detection start register 8 is set and detects a picture top satisfying predetermined conditions, and is then returned to the normal operation.

An output buffer 3a in the output buffer section 3 sequentially fetches the image compression data S2 and outputs the image compression data S2 as output image compression data S3 to a compression image data output terminal 4 by an FIFO method.

The processor 5 can detect the contents of the picture flag 2f and the picture type register 13 in the image compressor 2B through an external bus 6, and executes a main operation for accumulating the coding quantity stored in the picture generation coding quantity register 10 every time the picture flag 2f is set and for always calculating the newest picture start address in the output buffer 3a based on the accumulated value.

Furthermore, the processor 5 can detect the contents of the picture type register 13 and executes an interruption processing of setting an internal overflow flag 5f during an overflow in which the active state of a full flag signal SF is detected, and then bringing the stored value of the detection start register 8 in the picture top detector 7B into a set state through an external bus 26, and of setting the stored value of a discarded picture number register 14 based on the stored value of the picture type register 13.

Other structures are the same as those of the image compression coding apparatus according to the first embodiment shown in FIG. 1, and the main operation of the processor 5 is the same as the main operation in the first embodiment shown in FIG. 2.

Figure 6:
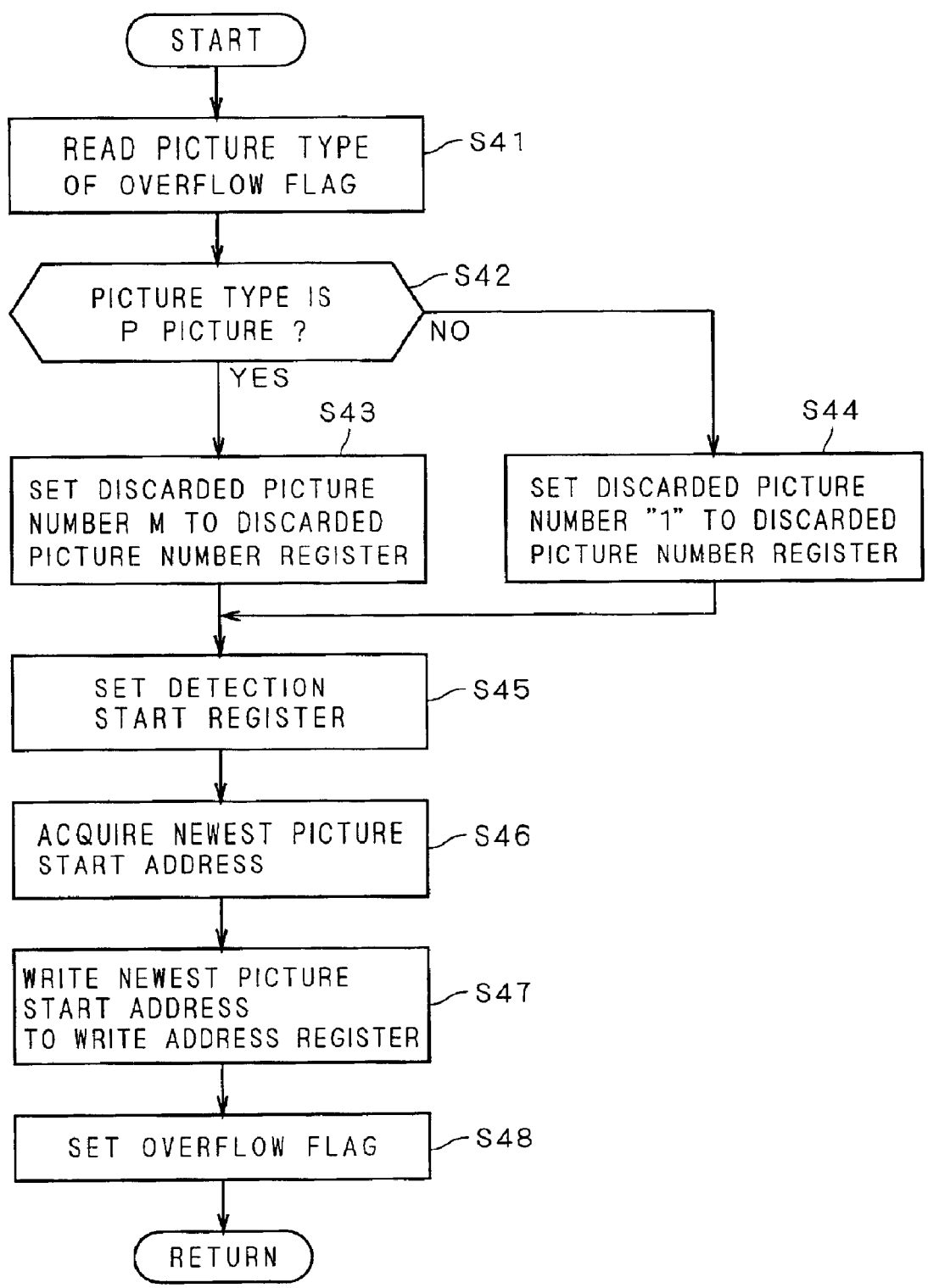
FIG. 6 is a flow chart showing an interrupting operation of a processor according to the second embodiment.

FIG. 6 is a flow chart showing the interruption processing of the processor 5 which is carried out during the overflow of the output buffer 3a.

With reference to FIG. 6, a picture type of an overflow picture is read from the picture type register 13 at Step S41 and it is decided whether the picture type is a P picture or not at Step S42.

Then, if it is decided that the picture type is the P picture at the Step S42, a discarded picture number M (>1) is set (a first mode is set) to the discarded picture number register 14 of the picture top detector 7B through the external bus 6 at Step S43. It is decided that the picture type is not the P picture, a discarded picture number of "1" is set (a second mode is set) to the discarded picture number register 14 at Step S44.

Thereafter, the detection start register 8 is brought into a set state through the external bus 6 at Step S45.

Subsequently, the newest picture start address previously obtained by the main operation is acquired at Step S46 and the newest picture start address is written to the write address register 9 at Step S47.

Then, the overflow flag 5f is set at Step S48 and the interruption processing is ended.

Figure 7:
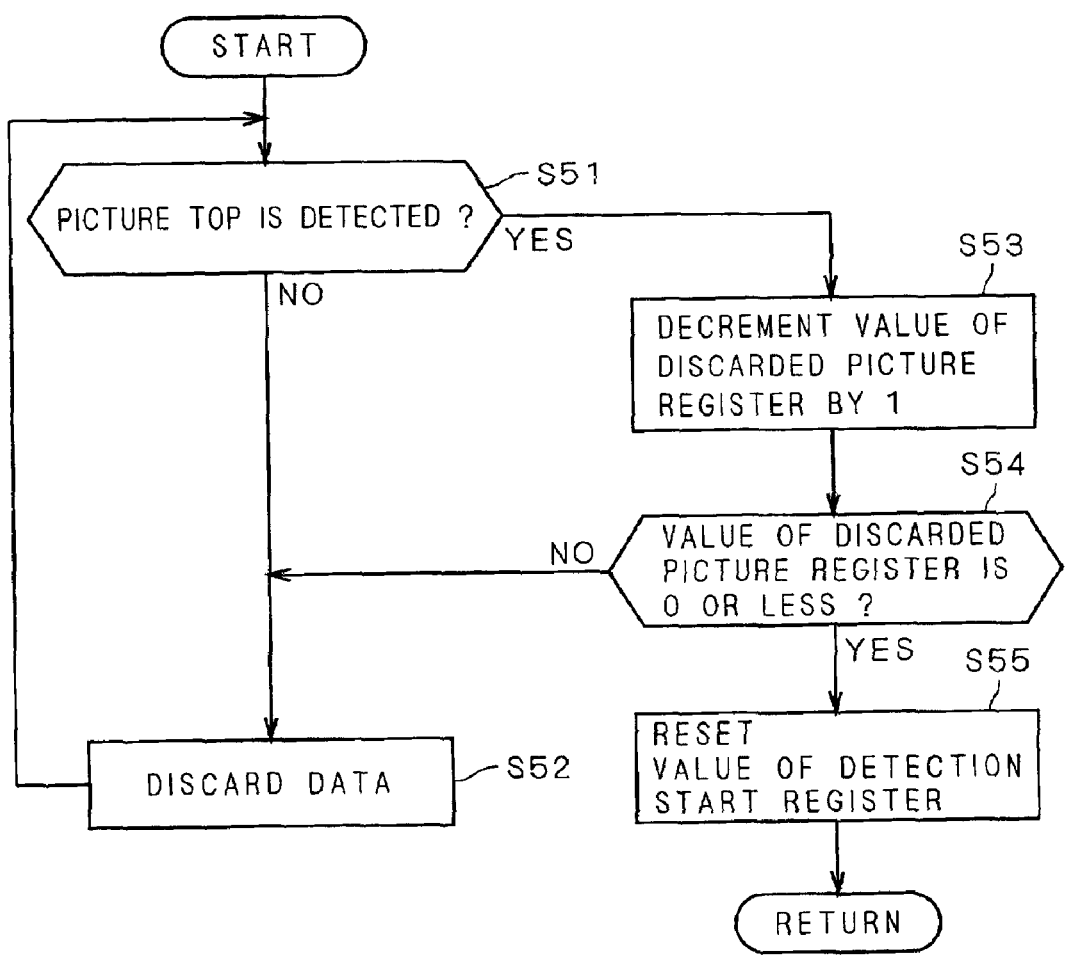
FIG. 7 is a flow chart showing a picture top detecting operation of a picture top detector according to the second embodiment.

FIG. 7 is a flow chart showing the picture top detecting operation of the picture top detector 7B to be executed when the stored value of the detection start register 8 is in the set state.

With reference to FIG. 7, at Step S51, it is decided whether a picture top is detected from the image compression data S2 or not. If the picture top is not detected, the image compression data S2 to be input are discarded at Step S52, and the processing is then returned to the Step S51. Subsequently, the image compression data S2 are discarded at the Step S52 until the picture top is detected at the Step S51.

When the picture top is detected at the Step S51, the stored value of the discarded picture number register 14 is decremented by 1 at the Step S54 and it is decided whether the stored value of the discarded picture register is "0" or not at the Step S54. If the stored value is equal to or greater than "1", the image compression data S2 are discarded at the Step S52 and the processing is returned to the Step S51.

On the other hand, if it is decided that the stored value of the discarded picture register is equal to or smaller than "0" at the Step S54, the detection start register 8 is brought into a reset state at Step S55 and the processing is ended.

Subsequently, the picture top detector 7B restarts the normal operation and exactly outputs the image compression data S2 as the image compression data S7 to the output buffer section 3.

By the picture top detecting operation of the picture top detector 7B, thus, the image compression data S2 of a picture obtained after the overflow picture are not discarded from the top but are output as the image compression data S7. Moreover, a part of the overflow picture is not continuously output as the image compression data S7 after the overflow.

In the image compression coding apparatus according to the second embodiment, accordingly, screen display is not carried out in such a configuration that the middle of a screen has an abnormality after the overflow so that a deterioration in picture quality can be minimized, and furthermore, a return time required after the overflow can be shortened in the same manner as in the first embodiment.

Furthermore, if the overflow picture is the P picture (the stored value of the discarded picture number register 14 is M), the picture top detector 7B can also discard (M−1) pictures subsequent thereto.

Accordingly, in the case in which the picture is circulated according to a cyclic rule of "IBBPBBPBBIBBPBB . . . " in the image compression data S2, the output image compression data S3 which do not greatly depart from the cyclic rule can be output by always discarding three pictures of "PBB" if M=3 is set and the P picture is an overflow picture. Continuous pictures from an I picture to a next I picture will be referred to as a GOP (Group of Pictures).

In the third embodiment, consequently, even if the P picture is the overflow picture, the expansion coding processing for a bit stream (output image compression data S3) in the image expansion coding apparatus is not complicated.

<Third Embodiment>

The image compression coding apparatuses according to the first and second embodiments serve to discard only an overflow picture when an overflow is generated in the I picture.

The I picture is a first picture for motion prediction coding in subsequent P and B pictures. Therefore, if an expansion coding processing for a bit stream (output image compression data S3) is carried out in such a state that the I picture is lacked, the disorder of a reproduced image is caused so that picture quality is deteriorated.

An image compression coding apparatus according to a third embodiment serves to eliminate such a drawback. The image compression coding apparatus according to the third embodiment can exactly use the structure according to the second embodiment shown in FIG. 6.

Figure 8:
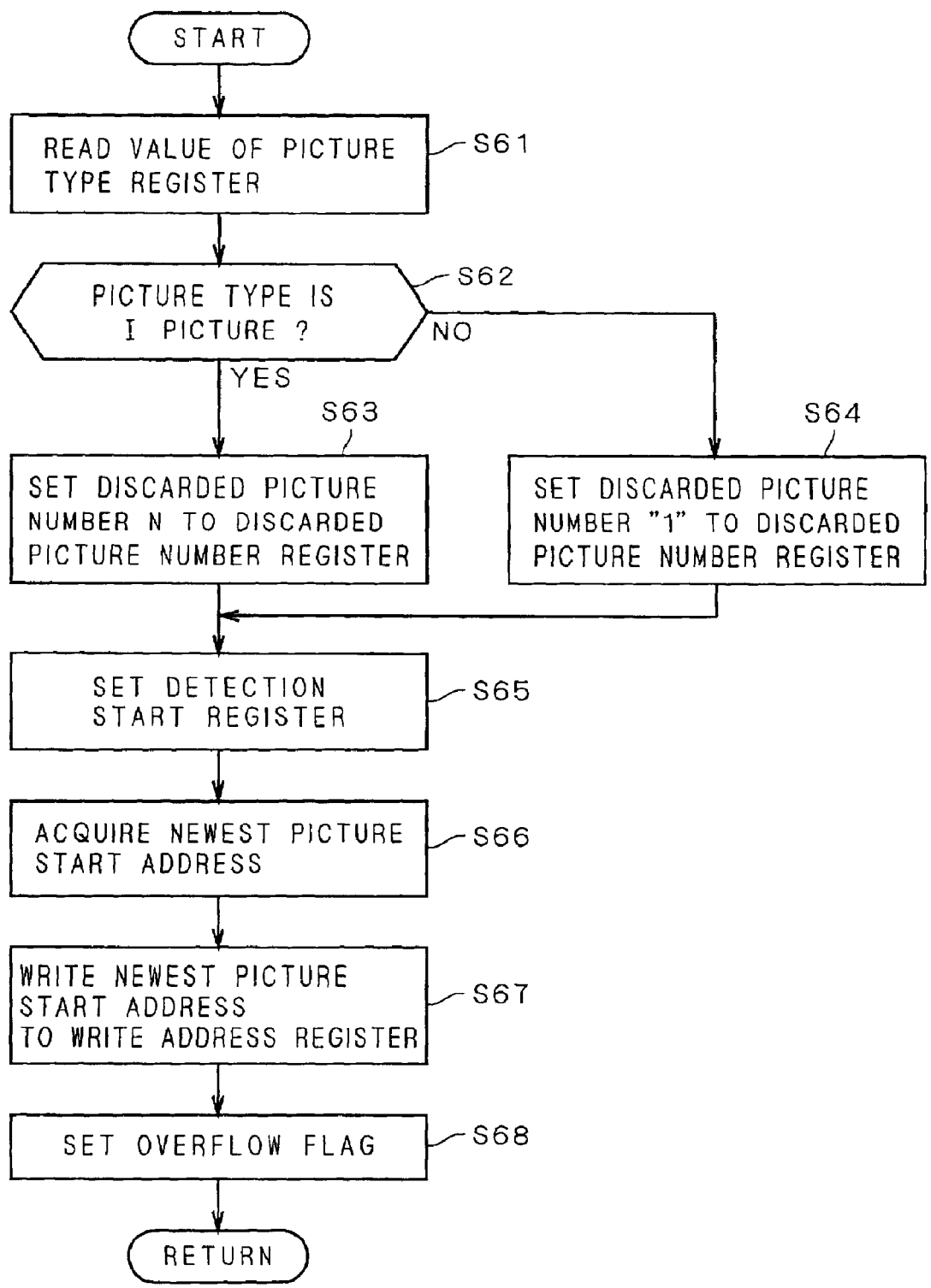
FIG. 8 is a flow chart showing an interrupting operation of a processor according to a third embodiment.

FIG. 8 is a flow chart showing an interrupting operation of a processor 5 which is carried out during an overflow of an output buffer 3a.

With reference to FIG. 8, a picture type of an overflow picture is read from a picture type register 13 at Step S61 and it is decided whether a picture type is a P picture or not at Step S62.

Then, if it is decided that the picture type is an I picture at the Step S62, a discarded picture number N (>1) is set (a first mode is set) to a discarded picture number register 14 at Step S63. It is decided that the picture type is not the I picture, a discarded picture number of "1" is set (a second mode is set) to the discarded picture number register 14 at Step S64.

Then, a detection start register 8 is brought into a set state at Step S65, the newest picture start address is acquired at Step S66 and the newest picture start address is written to a write address register 9 at Step S67.

Subsequently, an overflow flag 5f is set at Step S68 and the interruption processing is ended.

A main operation of the processor 5 is the same as that in the first embodiment shown in FIG. 2, and a picture top detecting operation of a picture top detector 7B is the same as that in the second embodiment shown in FIG. 7.

In the image compression coding apparatus according to the third embodiment, thus, screen display is not carried out in such a configuration that the middle of a screen has an abnormality after the overflow of the output buffer 3a so that a deterioration in picture quality can be minimized, and furthermore, a return time required after the overflow can be shortened in the same manner as the image compression coding apparatus according to the first embodiment.

Furthermore, if the overflow picture is the I picture (the stored value of the discarded picture number register 14 is N), the picture top detector 7B can also discard (N−1) pictures subsequent thereto.

Accordingly, in the case in which the picture is circulated according to a cyclic rule of "IBBPBBPBBIBBPBB . . . " in image compression data S2, the output image compression data S3 which do not greatly depart from the cyclic rule can be output by always discarding nine pictures of "IBBPBBPBB" if N=9 is set and the I picture is an overflow picture.

As a result, even if the I picture overflows, the picture quality of an image reproduced based on the output image compression data S3 is not deteriorated.

The second embodiment and the third embodiment are combined to set M to the P picture, N to the I picture and "1" to the B picture in the interruption processing of the processor 5. Consequently, even if the overflow is generated in the P picture, the expansion coding processing for the bit stream (output image compression data S3) does not become complicated in the image expansion coding apparatus. Furthermore, even if the overflow is generated in the I picture, the picture quality of an image reproduced based on the output image compression data S3 is not deteriorated.

<Fourth Embodiment>

In the image compression coding apparatuses according to the first to third embodiments, the image compression data S2 are discarded on a picture unit so that the discarded pictures are decreased to change the total number of pictures. An image compression coding apparatus according to a fourth embodiment serves to eliminate such a drawback.

Figure 9:
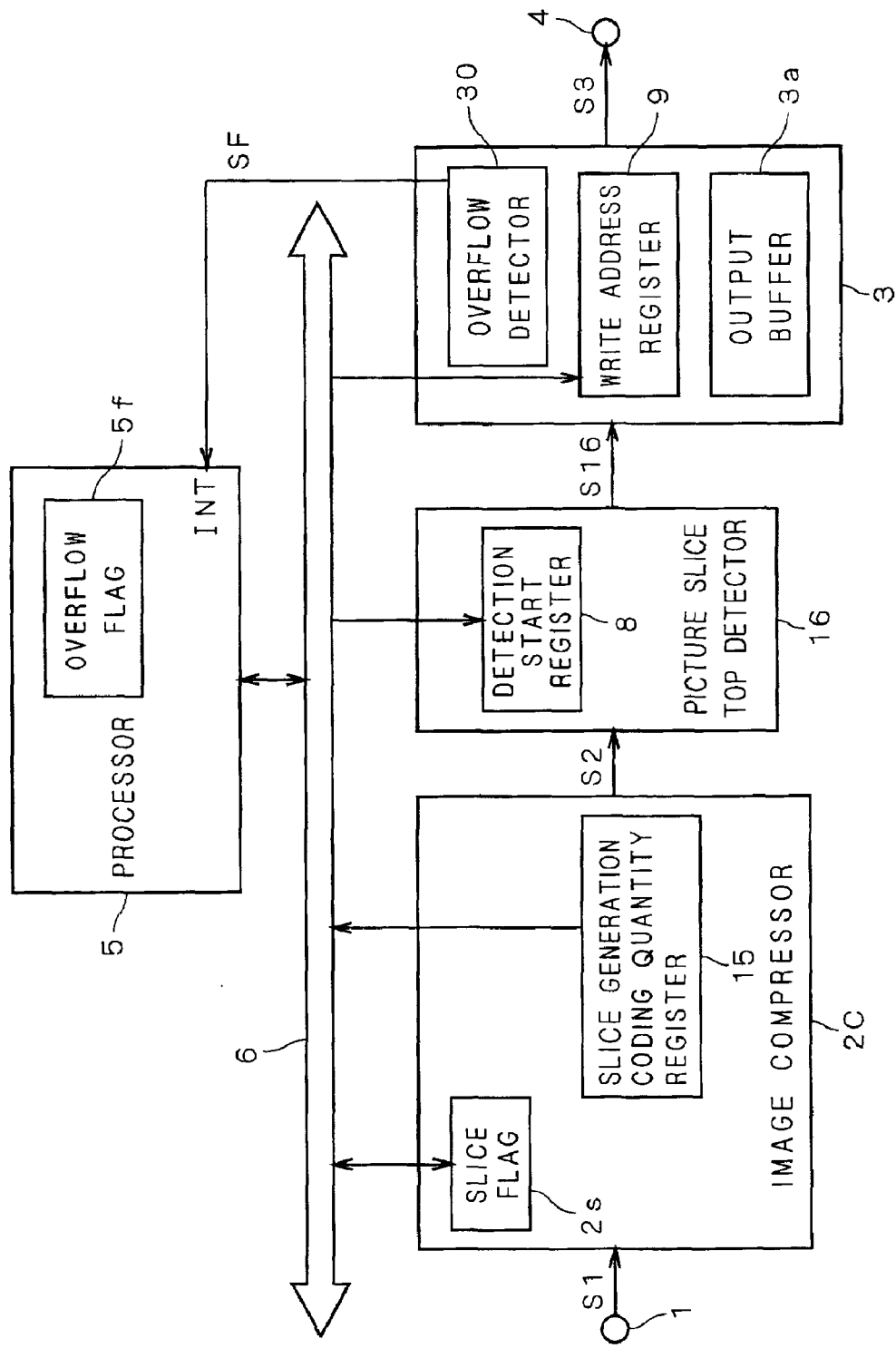
FIG. 9 is a block diagram showing a whole structure of an image compression coding apparatus according to a fourth embodiment.

FIG. 9 is a block diagram showing a structure of the image compression coding apparatus according to the fourth embodiment. As shown in FIG. 9, an image compressor 2C has a slice flag 2s and a slice generation coding quantity register 15 provided therein. Every time input image data S1 are fetched for one slice, a coding quantity obtained after an image compression coding processing is written to the slice generation coding quantity register 15 and a slice flag 2s is set.

The slice is indicative of information common to small screens obtained by dividing one screen to have an optional length, and is subdivided data on a processing unit which are obtained by further subdividing a picture.

A picture slice top detector 16 exactly outputs the image compression data S2 as image compression data S16 to an output buffer section 3 during a normal operation, executes a picture slice top detection processing for discarding the image compression data S2 until a top of either a picture or a slice in the image compression data S2 is detected during start address detection in such a state that the stored value of a detection start register 8 is set, and then restarts the normal operation after detecting a top of either the picture or the slice.

More specifically, in the case in which the top of the picture is detected earlier than that of the slice by the picture slice top detector 16, the image compression data S2 are discarded before the top of the picture is detected. In the case in which the top of the slice is detected earlier than that of the picture, the image compression data S2 are discarded before the top of the slice is detected. Accordingly, a picture head present on the top of the picture can be prevented from being erroneously discarded during the detection of the start address. The top of the slice can be detected in the same manner as the top of the picture.

An output buffer 3a in the output buffer section 3 sequentially fetches the image compression data S16 and outputs the image compression data S16 as output image compression data S3 to a compression image data output terminal 4 by an FIFO method.

A processor 5 can detect the contents of the slice flag 2s in the image compressor 2C through an external bus 6, and executes a main operation for accumulating the coding quantity stored in the slice generation coding quantity register 15 every time the slice flag 2s is set and for always calculating the newest slice start address in the output buffer 3a based on the accumulated value.

Moreover, when detecting the active state of a full flag signal SF, the processor 5 executes an interruption processing of bringing the stored value of the detection start register 8 in the picture slice top detector 16 into a set state through an external bus 26 after setting an internal overflow flag 5f.

Other structures are the same as those of the first embodiment shown in FIG. 1. Moreover, the main operation of the processor 5 is the same as the flow according to the first embodiment shown in FIG. 2 except that the processings of the Steps S12 and S13 are replaced with a processing of reading a slice generation coding quantity and a processing of accumulating the slice generation coding quantity, respectively.

The contents of the interruption processing of the processor 5 are the same as the flow according to the first embodiment shown in FIG. 3 except that the newest picture start address is replaced with the newest slice start address, and the slice start address detecting operation of the picture slice top detector 16 is the same as the flow according to the first embodiment shown in FIG. 4 except that the processing of the Step S31 is replaced with a processing of deciding the presence of detection of a slice top.

In the image compression coding apparatus having such a structure according to the fourth embodiment, screen display is not carried out in such a configuration that the middle of a screen has an abnormality after the overflow so that a deterioration in picture quality can be minimized, and furthermore, a return time required after the overflow can be shortened in the same manner as in the first embodiment.

In the image compression coding apparatus according to the fourth embodiment, furthermore, there is not such a drawback that the total number of pictures is changed.

<Fifth Embodiment>
(First Manner)

In the image compression coding apparatuses according to the first to third embodiments, the image compression data S2 are discarded on a picture unit. Therefore, there is such a drawback that the total number of pictures is changed. An image compression coding apparatus according to a fifth embodiment serves to eliminate such a drawback.

Figure 10:
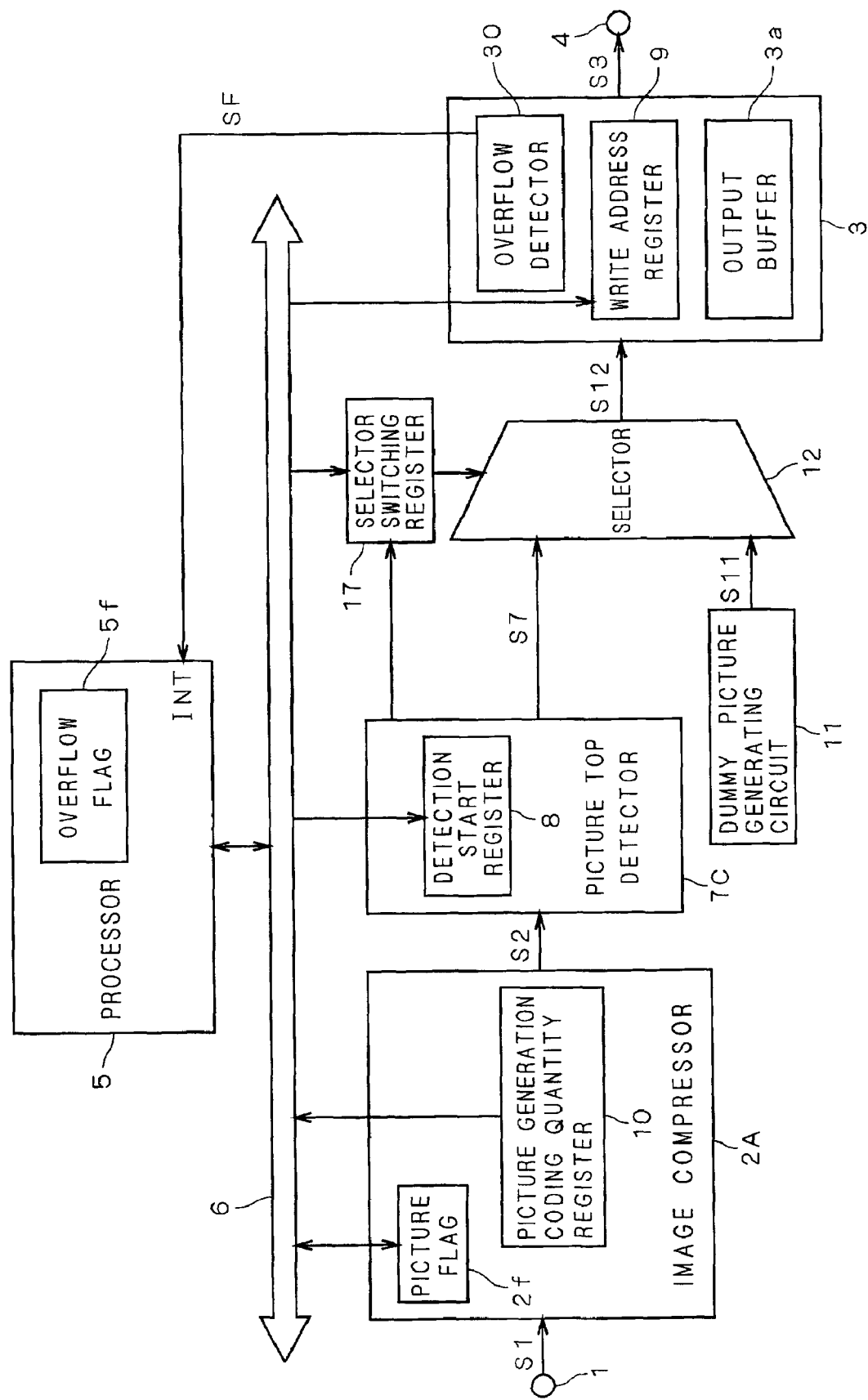
FIG. 10 is a block diagram showing a whole structure of a first manner in an image compression coding apparatus according to a fifth embodiment.

FIG. 10 is a block diagram showing a structure of a first manner of the image compression coding apparatus according to the fifth embodiment. As shown in FIG. 10, a picture top detector 7C exactly outputs image compression data S2 as image compression data S7 to an output buffer section 3 during a normal operation, executes a picture top detection processing of discarding the image compression data S2 until a top of a picture of the image compression data S2 is detected during start address direction in such a state that the stored value of a detection start register 8 is set, and then restarts the normal operation after detecting the top of the picture.

A selector 12 receives image compression data S7 and dummy stream data S11 from the picture top detector 7C and a dummy picture generating circuit 11, and outputs either of the image compression data S7 and the dummy stream data S11 as selected image compression data S12 to the output buffer section 3 based on the stored value of a selector switching register 17.

Thus, a section for inserting dummy stream data is constituted by the dummy picture generating circuit 11, the selector 12 and the selector switching register 17. The stored value of the selector switching register 17 is set to be an initial value indicative of the selection of the image compression data S7.

Stream data having a smaller coding quantity than a mean coding quantity of a picture in the image compression data S2 (S7) are used for the dummy stream data S11.

An output buffer 3a in the output buffer section 3 sequentially fetches the selected image compression data S12 and outputs the selected image compression data S12 as output image compression data S3 to a compression image data output terminal 4 by an FIFO method.

Figure 11:
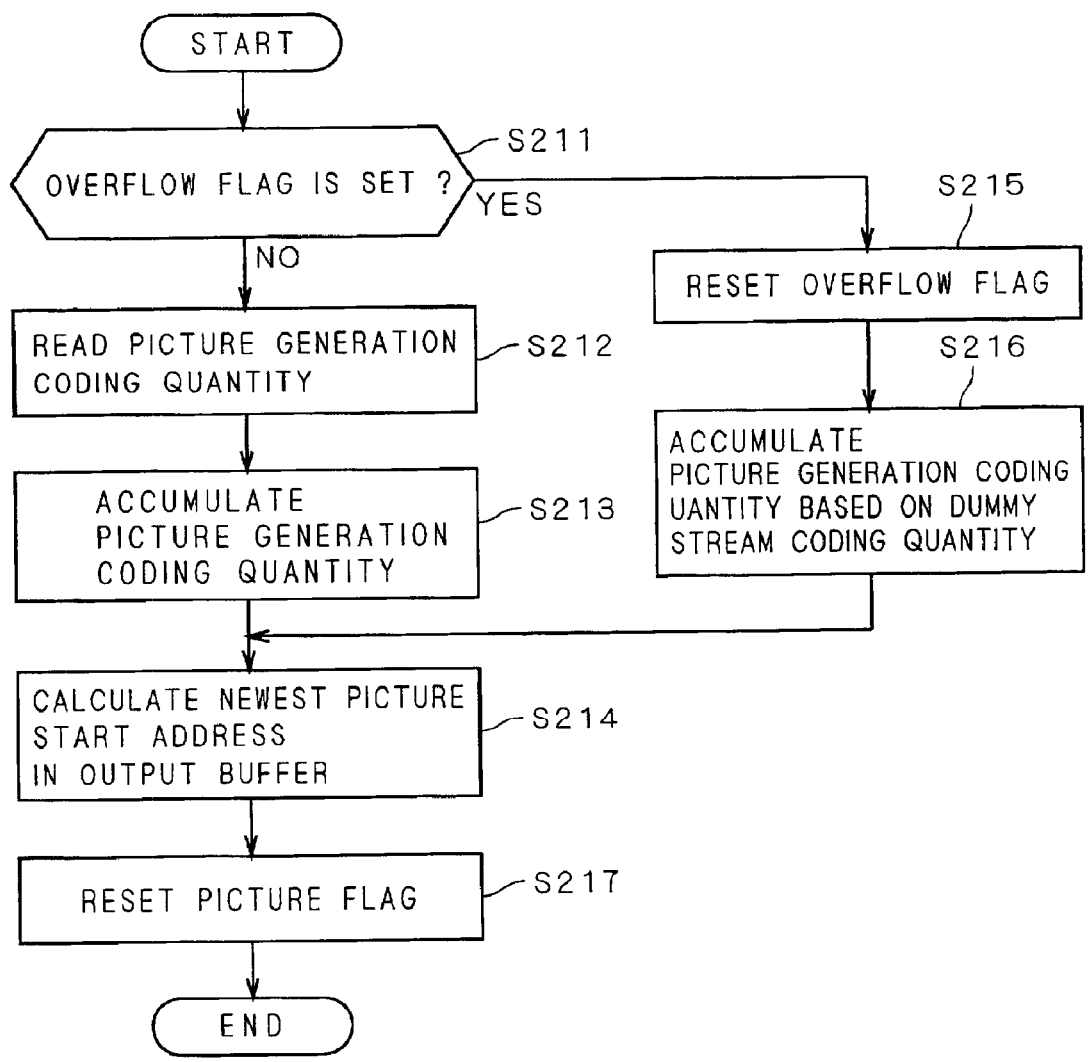
FIG. 11 is a flow chart showing a main operation of a processor according to the fifth embodiment.

FIG. 11 is a flow chart showing a main operation of a processor 5 according to the firth embodiment. Processings at Steps S211 to S215 are carried out in the same manner as those of the Steps S11 to S15 shown in FIG. 2.

After the Step S215, a picture generation coding quantity is accumulated based on a dummy stream coding quantity to be the coding quantity of the dummy stream data S11 at Step S216.

At the Step S216, thus, the picture generation coding quantity is accumulated based on the dummy stream coding quantity during an overflow. Therefore, it is possible to carry out an accumulating operation adapted to the selected image compression data S12 in which the dummy stream data S11 are inserted during the overflow.

Accordingly, the calculation of the newest picture start address at the Step S214 which is to be executed after the processing of the Step S213 or S216 can also be carried out without making any mistake during the insertion of the dummy stream data S11.

Then, the picture flag 2f is reset at Step S217 and the processing is ended.

Moreover, the processor 5 carries out an interruption processing when detecting the active state of a full flag signal SF, that is, brings the stored value of the detection start register 8 in the picture top detector 7C into a set state through an external bus 26 after setting an internal overflow flag 5f, and sets the stored value of the selector switching register 17 to the contents indicative of the selection of the dummy stream data S11. Other structures are the same as those of the first embodiment shown in FIG. 1.

Figure 12:
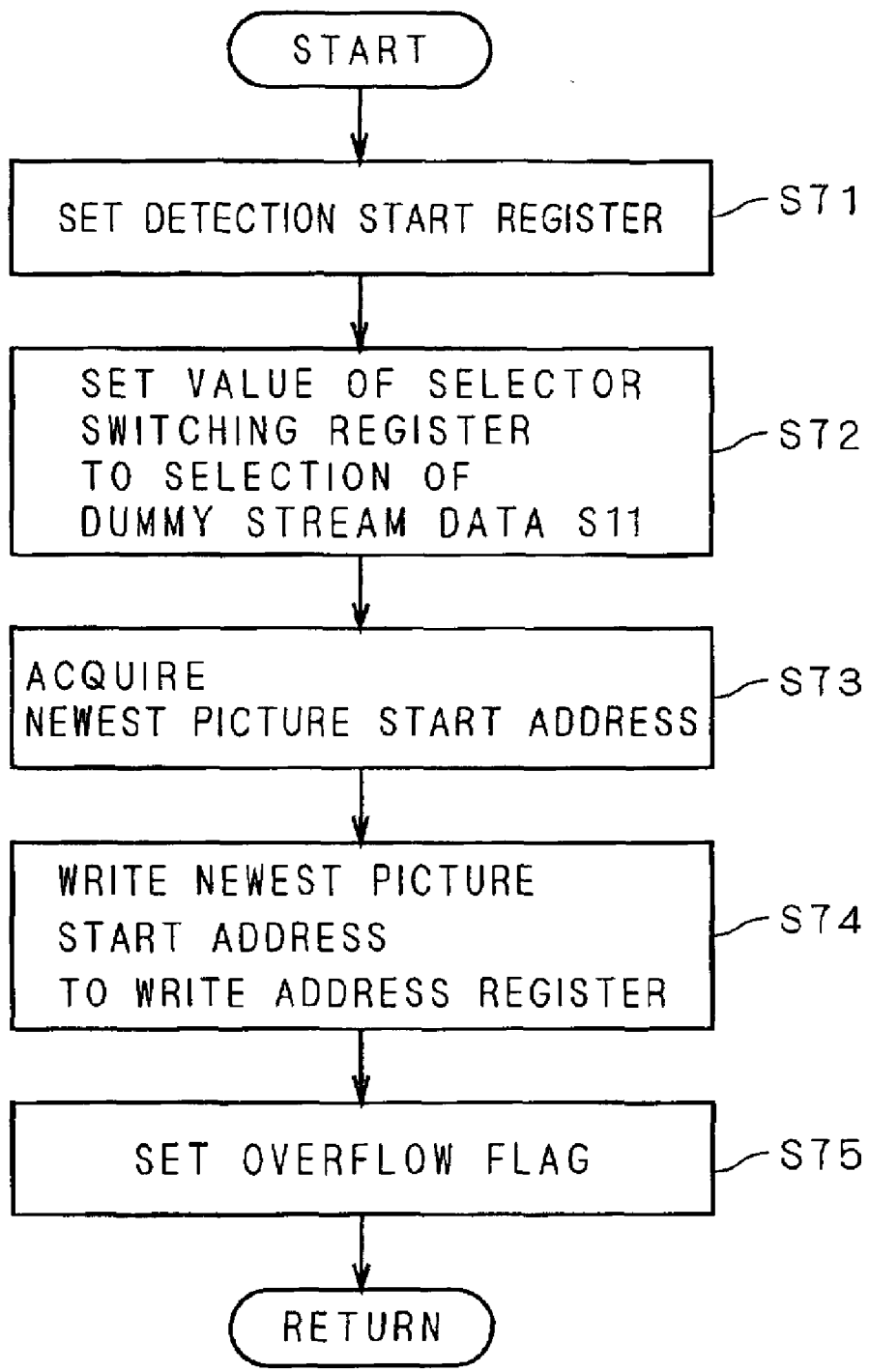
FIG. 12 is a flow chart showing an interrupting operation of the processor according to the fifth embodiment.

FIG. 12 is a flow chart showing the interruption processing of the processor 5 which is carried out during the overflow of the output buffer 3a.

With reference to FIG. 12, the detection start register 8 is brought into the set state through an external bus 6 at Step S71.

At Step S72, subsequently, the stored value of the selector switching register 17 is set to be a value indicative of the selection of the dummy stream data S11. Accordingly, the dummy stream data S11 are output as the selected image compression data S12 of the selector 12 in place of the image compression data S7 after the processor 5 executes the processing of the Step S72.

Then, the newest picture start address is acquired at Step S73 and the newest picture start address is written to the write address register 9 at Step S74.

Subsequently, the overflow flag 5f is set at Step S75 and the interruption processing is ended.

Figure 13:
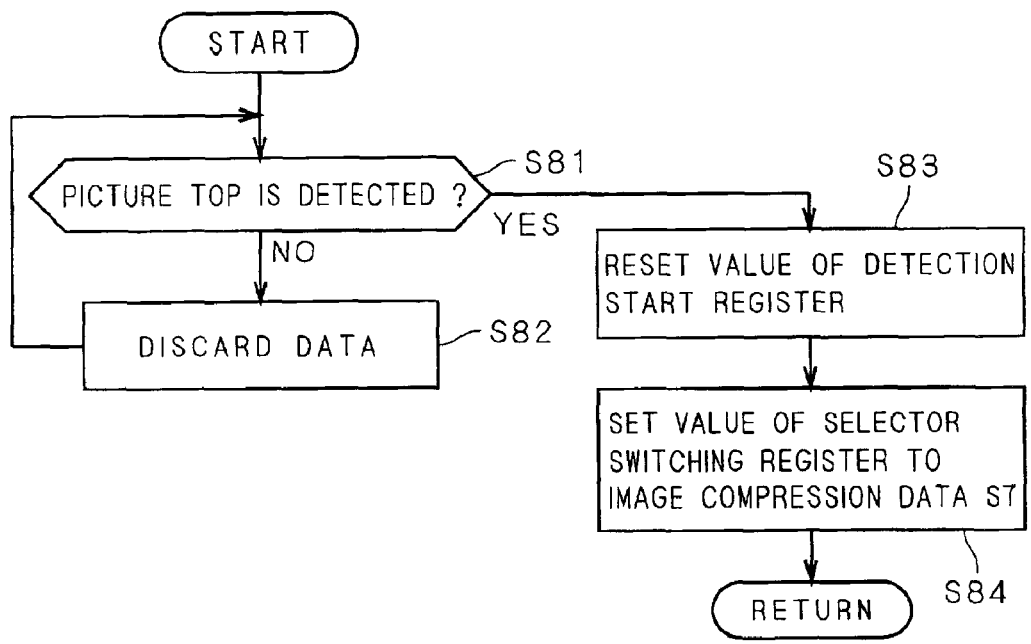
FIG. 13 is a flow chart showing a picture top detecting operation of a picture top detector according to the fifth embodiment.

FIG. 13 is a flow chart showing the picture top detecting operation of the picture top detector 7C to be executed when the stored value of the detection start register 8 is in the set state.

With reference to FIG. 13, at Step S31, it is decided whether a picture top is detected from the image compression data S2 or not. If the picture top is not detected, the image compression data S2 to be input are discarded at Step S82, and the processing is then returned to the Step S81. Subsequently, the image compression data S2 are discarded at the Step S82 until the picture top is detected at the Step S81.

When the top of the picture is detected at the Step S81, the detection start register 8 is brought into a reset state at Step S83.

Then, the stored value of the selector switching register 17 is set to be a value indicative of the selection of the image compression data S7 at Step S84 and the processing is ended. Accordingly, after the picture top detector 7C executes the processing of the Step S84, the image compression data S7 are output as the selected image compression data S12 of the selector 12 in place of the dummy stream data S11.

Subsequently, the picture top detector 7C restarts the normal operation and exactly outputs the image compression data S2 as the image compression data S7 to the output buffer section 3.

After the Step S72 of the processor 5 is executed during an overflow, the selector 12 outputs the dummy stream data S11 as the selected image compression data S12 before the processing of the Step S84 is executed by the picture top detector 7C. Therefore, the processing of discarding the image compression data S2 at the Step S82 is not essential.

In the image compression coding apparatus according to the first manner of the fifth embodiment, thus, screen display is not carried out in such a configuration that the middle of a screen has an abnormality after the overflow so that a deterioration in picture quality can be minimized, and furthermore, a return time required after the overflow can be shortened in the same manner as in the first embodiment.

Furthermore, when an overflow picture is detected, the dummy stream data S11 are inserted instead. Therefore, there is not such a drawback that the total number of pictures is changed.

(Second Manner)

In the first manner, the stream data having a smaller coding quantity than a mean coding quantity of a picture in the image compression data S2 (S7) are used as the dummy stream data S11.

However, when the output buffer 3a is set in an overflow state, it is supposed that input image data S1 defining a complicated image are continuously input. Accordingly, in the case in which the dummy stream data S11 having a comparatively large coding quantity are inserted in place of a picture to be discarded, there is a high possibility that the output buffer 3a might overflow again.

In the second manner, stream data having a small coding quantity such as a black or gray screen are generated as the dummy stream data S11 from a dummy picture generation circuit 11. A structure and an operation are the same as those in the first manner except that the contents of the dummy stream data S11 are varied.

As a result, it is possible to reliably prevent an overflow from being generated again after the overflow of the output buffer 3a.

<Sixth Embodiment>

The rate control is carried out while always monitoring a picture generation coding quantity on the processor 5 side and virtually calculating a filling quantity or the like in an output buffer 3a based on the picture generation coding quantity in the processor 5.

However, when an overflow is generated in the output buffer 3a and dummy stream data S11 are inserted in place of image compression data S7, an erroneous result of calculation based on a picture generation coding quantity is obtained during the insertion of the dummy stream data S11 because the picture generation coding quantity is different from a coding quantity of the dummy stream data S11. Consequently, there is such a drawback that the rate control cannot be carried out with high precision. An image compression coding apparatus according to a sixth embodiment serves to eliminate such a drawback.

A whole structure, a main operation, an interrupting operation and a picture top address detecting operation in the image compression coding apparatus according to the sixth embodiment are the same as those of the fifth embodiment.

Figure 14:
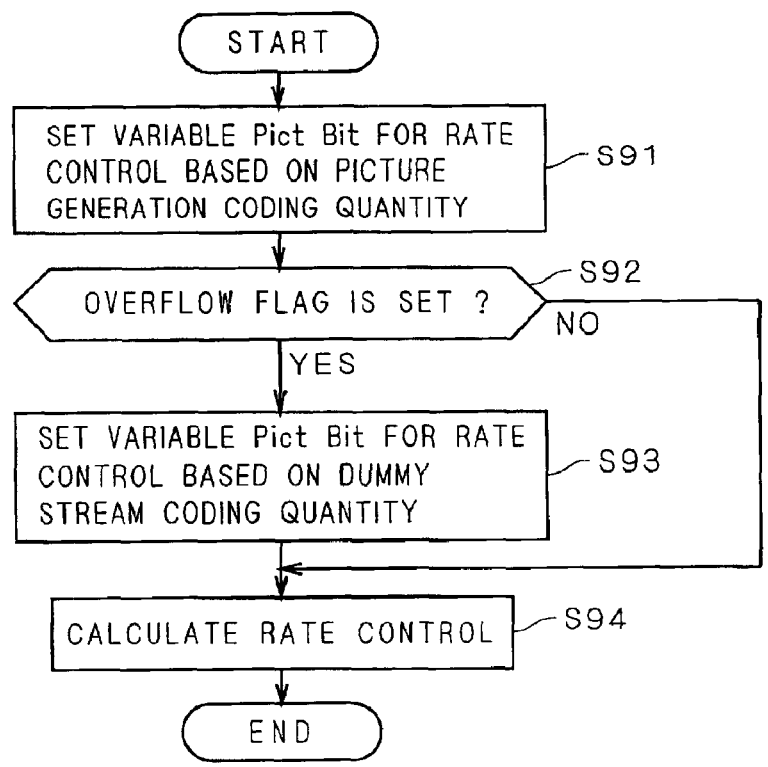
FIG. 14 is a flow chart showing a rate control operation in an image compression coding apparatus according to a sixth embodiment.

FIG. 14 is a flow chart showing a rate control operation in a processor 5 of the image compression coding apparatus according to the sixth embodiment.

With reference to FIG. 14, a variable PictBit for rate control is set based on a picture generation coding quantity obtained by a picture generation coding quantity register 10 at Step S91.

At Step S92, then, it is decided whether an overflow flag 5f is set or not. If the overflow flag 5f is set, the processing proceeds to Step S93. If the overflow flag 5f is not set, the processing skips the Step S93 and proceeds to Step S94.

At the Step S93 to be executed when the overflow flag 5f is set, the variable PictBit for rate control is set based on a coding quantity of dummy stream data S11 (a dummy stream coding quantity).

Thereafter, a rate control operation is carried out based on the variable PictBit for rate control at the Step S94.

In the image compression coding apparatus according to the sixth embodiment, thus, the rate control operation based on the variable PictBit for rate control which reflects the dummy stream coding quantity can be carried out for a period in which an output buffer 3a overflows and the dummy stream data S11 are output as selected image compression data S12. Therefore, the rate control can also be carried out with high precision for a period in which the dummy stream data S11 are inserted.

<Seventh Embodiment>

While the dummy picture generating circuit 11, the selector 12 and the selector switching register 17 have been added to insert the dummy stream data S11 in the fifth and sixth embodiments, the dummy stream data are inserted by a processor 5 without using them in an image compression coding apparatus according to a seventh embodiment.

Figure 15:
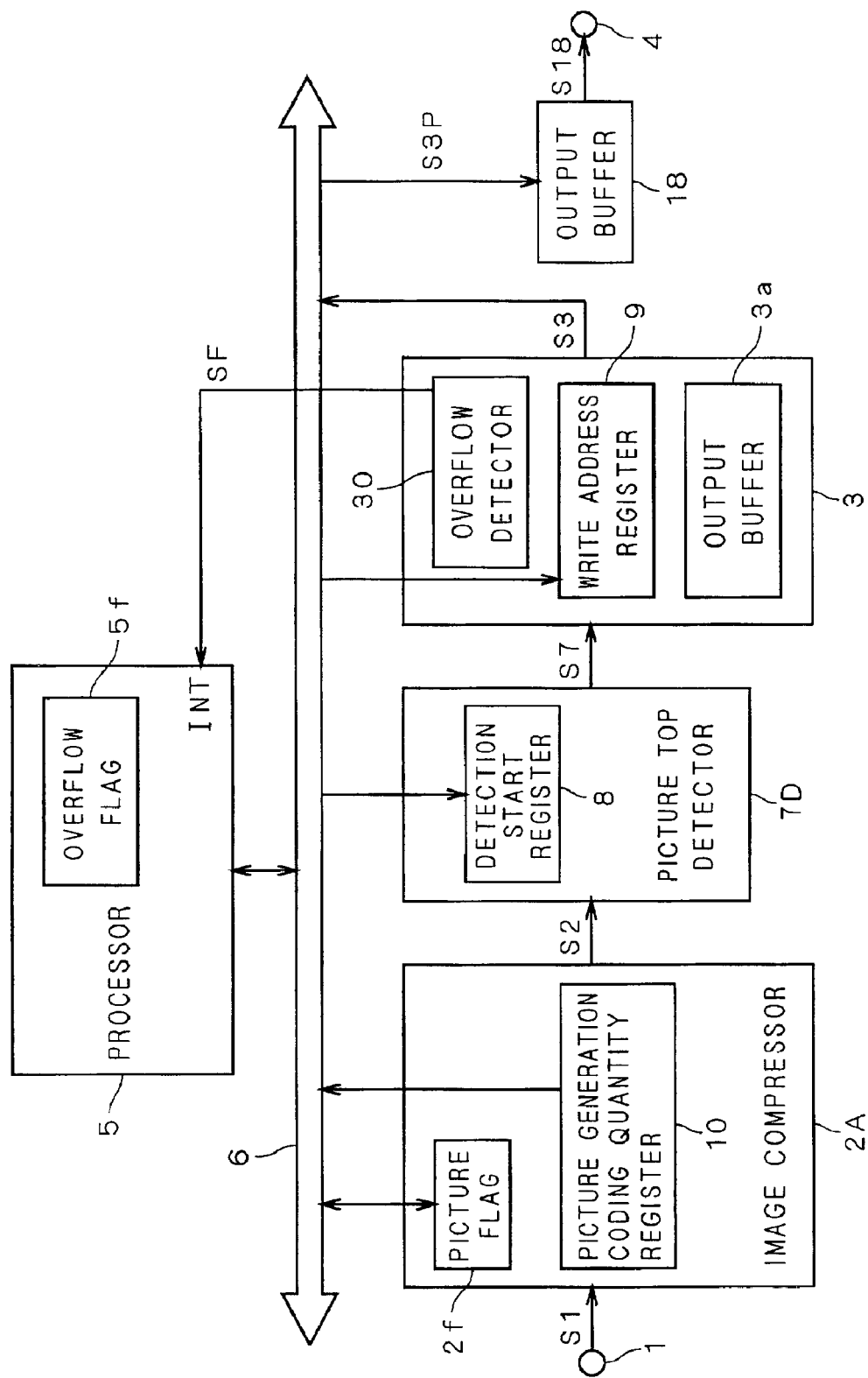
FIG. 15 is a block diagram showing a whole structure of an image compression coding apparatus according to a seventh embodiment.

FIG. 15 is a block diagram showing a whole structure of the image compression coding apparatus according to the seventh embodiment. As shown in FIG. 15, output image compression data S3 are once input from an output buffer section 3 to the processor 5 through an external bus 6, the processor 5 sends output image compression data S3P to an output buffer 18 in an FIFO method through the external bus 6, and the output buffer 18 sends output image compression data S18 to a compression image data output terminal 4.

Moreover, a picture top detector 7D has the function of inserting a dummy insertion mark (a predetermined bit string) indicative of an overflow position in image compression data S2 during a picture top detecting operation in addition to the same processing as that of the picture top detector 7A according to the first embodiment or the like.

Other structures are the same as those of the first embodiment shown in FIG. 1. Moreover, a main operation of the processor 5 is the same as the operation in the fifth embodiment shown in FIG. 11, and an interrupting operation is the same as that in the first embodiment shown in FIG. 3.

Figure 16:
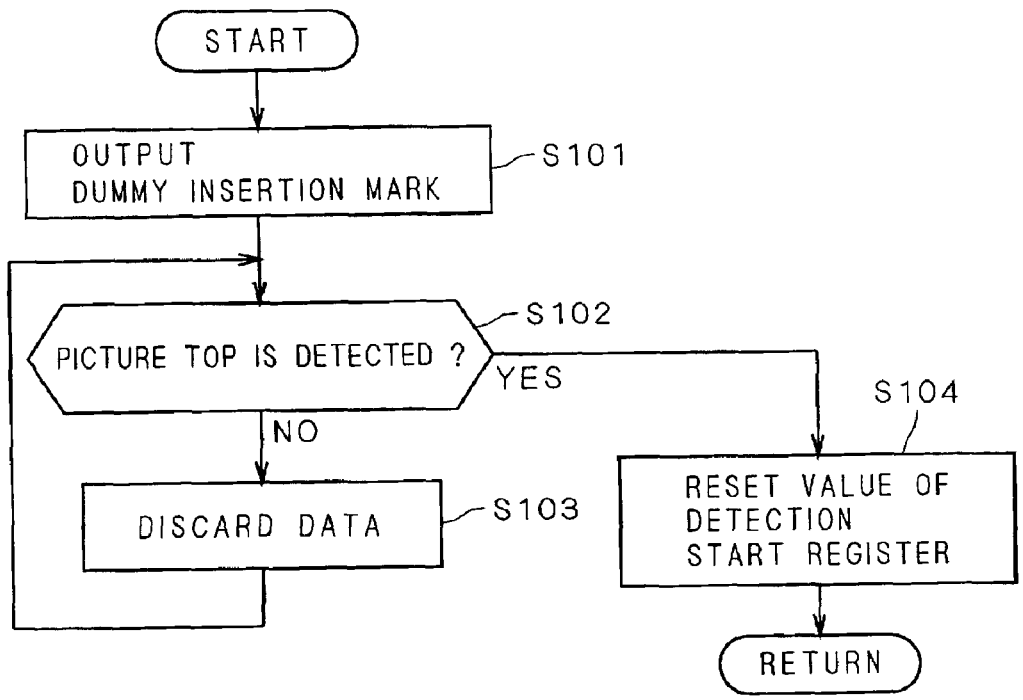
FIG. 16 is a flow chart showing a picture top detecting operation of a picture top detector according to the seventh embodiment.

FIG. 16 is a flow chart showing the picture top detecting operation of the picture top detector 7D.

With reference to FIG. 16, a dummy insertion mark is output at Step S101.

At Step S102, then, it is decided whether a picture top is detected from the image compression data S2 or not. If the picture top is not detected, the image compression data S2 to be input are discarded at Step S103 and the processing returns to the Step S102. Subsequently, the image compression data S2 are discarded at the Step S103 until the picture top is detected at the Step S102.

When the picture top is detected at the Step S102, a detection start register 8 is brought into a reset state at Step S104 and the processing is ended.

Subsequently, the picture top detector 7D restarts a normal operation and exactly outputs the image compression data S2 as image compression data S7 to the output buffer section 3.

By the picture top detecting operation of the picture top detector 7D, thus, the dummy insertion mark is inserted in place of the discarded overflow picture. Then, the image compression data S2 of a picture succeeding to the overflow picture are output as the image compression data S7 from a starting address. Moreover, a part of the overflow picture is not continuously output as the image compression data S7 after an overflow.

Figure 17:
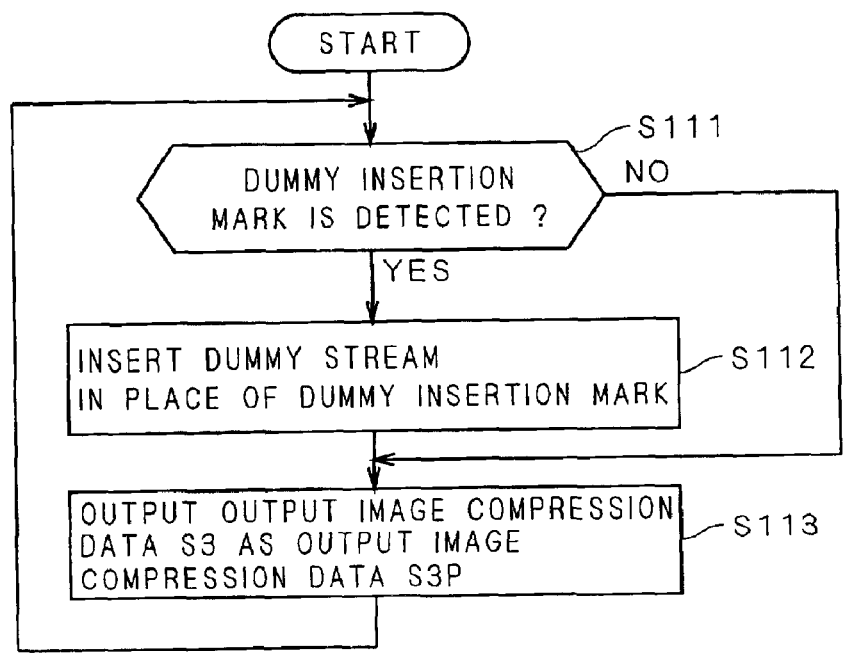
FIG. 17 is a flow chart showing an operation for inserting dummy stream data through a processor according to the seventh embodiment.

FIG. 17 is a flow chart showing an operation for inserting dummy stream data through the processor 5.

With reference to FIG. 17, it is decided whether or not the dummy insertion mark is inserted in the output image compression data S3 at Step S111.

If the dummy insertion mark is inserted in the output image compression data S3, previously prepared dummy stream data are inserted in place of the dummy insertion mark at Step S112. If the dummy insertion mark is not inserted, the processing skips the Step S112 and proceeds to Step S113.

At the Step S113, the output image compression data S3 are output as the output image compression data S3P.

Thus, the processor 5 outputs the output image compression data S3P having the dummy stream data inserted therein in place of the dummy insertion mark in the output image compression data S3, thereby functioning as a dummy stream data inserting section. In the same manner as in the fifth embodiment, consequently, it is possible to eliminate such a drawback that the total number of pictures is changed.

In addition, a hardware constituting section for inserting dummy stream data comprising the dummy picture generating circuit 11, the selector 12 and the selector switching register 17 can be omitted. Therefore, even if the output buffer 18 is added, a circuit structure can be more simplified than that in the fifth embodiment.

<Eighth Embodiment>

While the insertion of the dummy stream data S11 has been carried out in the former stage of the output buffer section 3 in the fifth embodiment, an image compression coding apparatus according to an eighth embodiment has such a structure that the insertion of the dummy stream data is carried out in the latter stage of the output buffer section 3.

Figure 18:
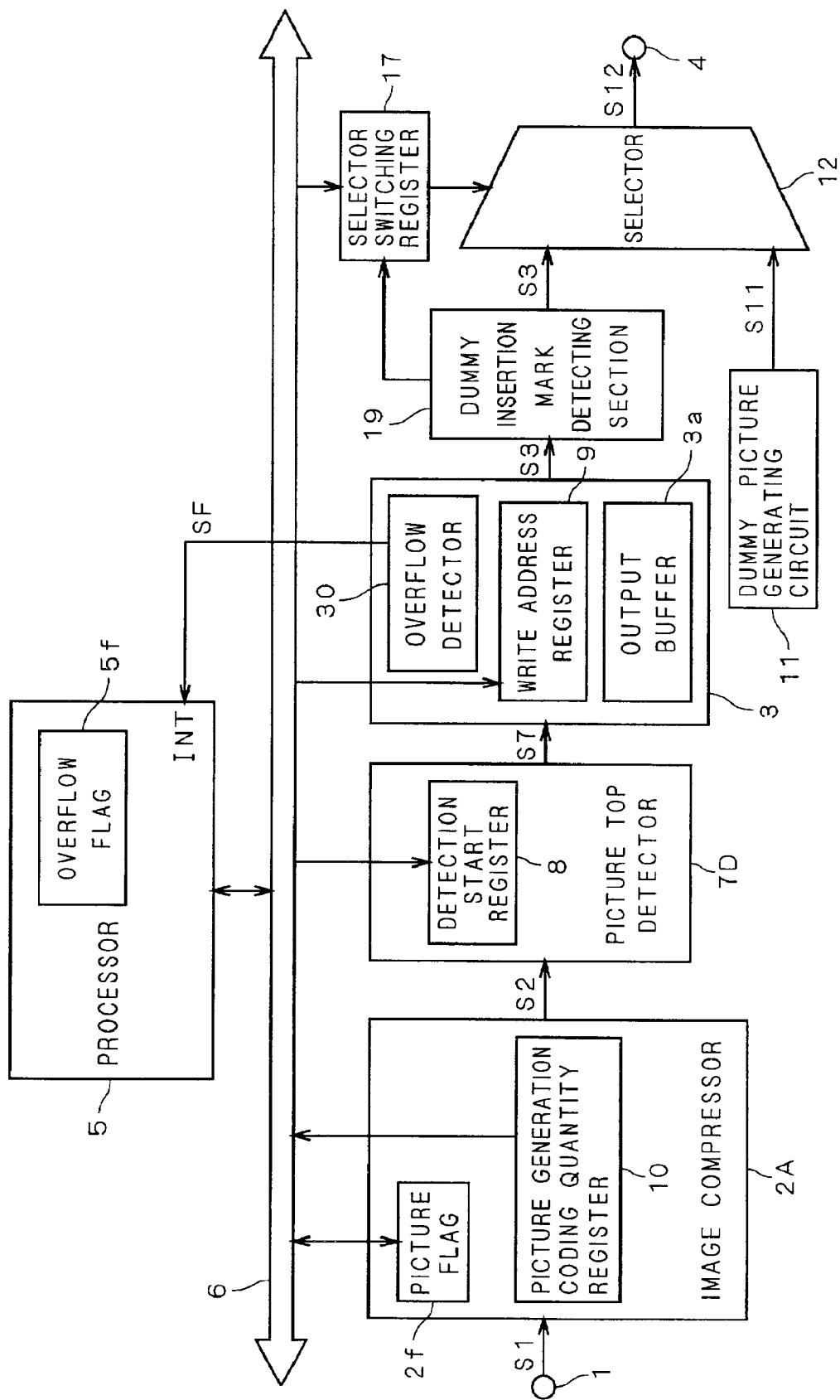
FIG. 18 is a block diagram showing a whole structure of an image compression coding apparatus according to an eighth embodiment.

FIG. 18 is a block diagram showing a whole structure of the image compression coding apparatus according to the eighth embodiment. As shown in FIG. 18, output image compression data S3 of the output buffer section 3 are given to a selector 12 through a dummy insertion mark detecting section 19.

The dummy insertion mark detecting section 19 causes the output image compression data S3 to pass therethrough and carries out a dummy insertion mark detecting operation which will be described below.

The selector 12 receives the output image compression data S3 and the dummy stream data S11 from the dummy insertion mark detecting section 19 and a dummy picture generating circuit 11, and outputs one of output image compression data S3D and the dummy stream data S11 as selected image compression data S12 to a compression image data output terminal 4 based on the stored value of a selector switching register 17. The stored value of the selector switching register 17 is set to be an initial value indicative of the selection of the output image compression data S3.

Thus, a section for inserting dummy stream data is constituted by the dummy picture generating circuit 11, the selector 12, the selector switching register 17 and the dummy insertion mark detecting section 19. Moreover, a picture top detector 7D executes the same picture top detecting operation as that in the seventh embodiment shown in FIG. 16.

Other structures are the same as those of the first embodiment shown in FIG. 1. Moreover, a main operation of a processor 5 is the same as the operation in the fifth embodiment shown in FIG. 11, and an interrupting operation is the same as that in the first embodiment shown in FIG. 3.

Figure 19:
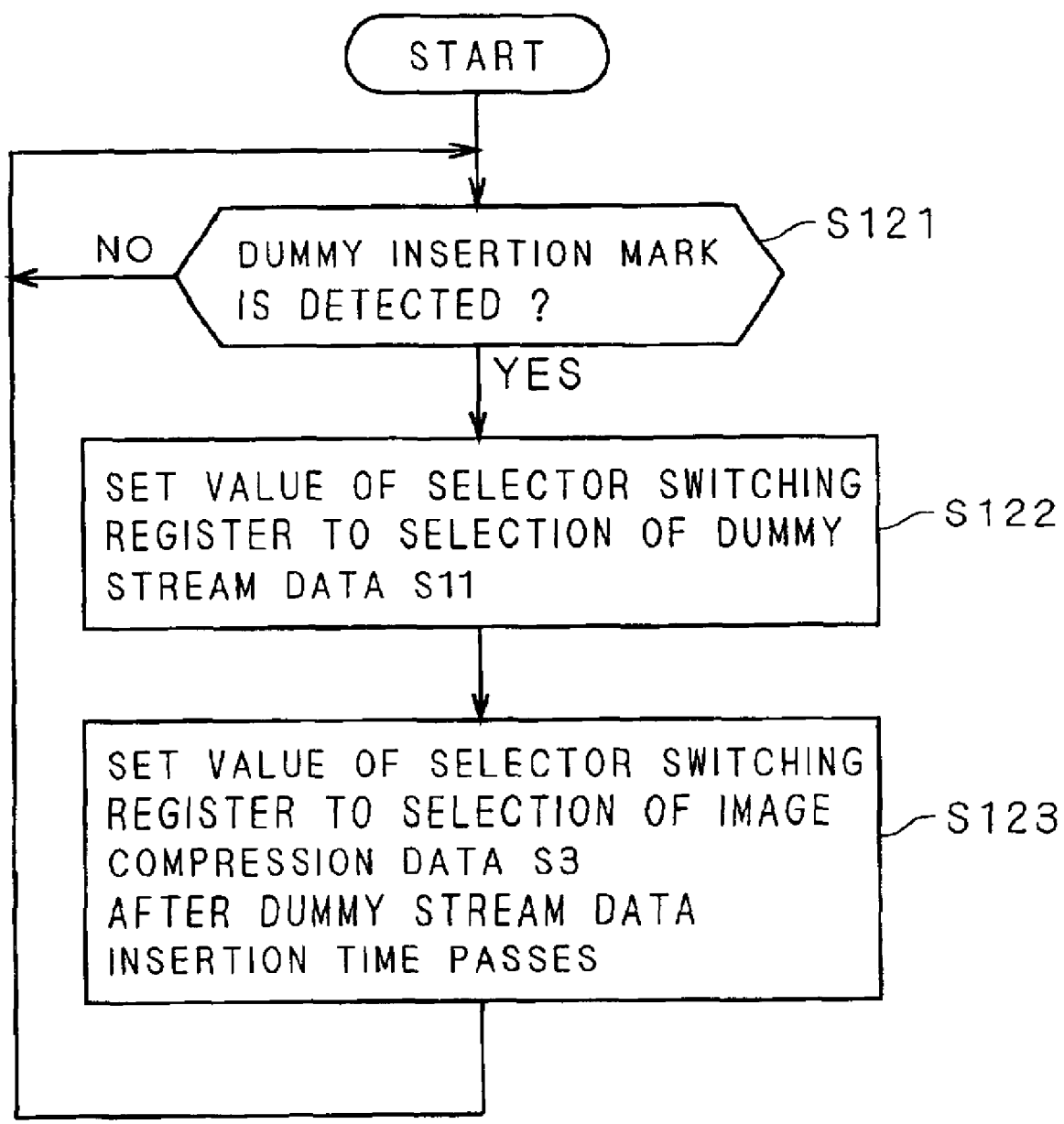
FIG. 19 is a flow chart showing an operation for detecting a dummy insertion mark through a dummy insertion mark detecting section according to the eighth embodiment.
Figure 20:
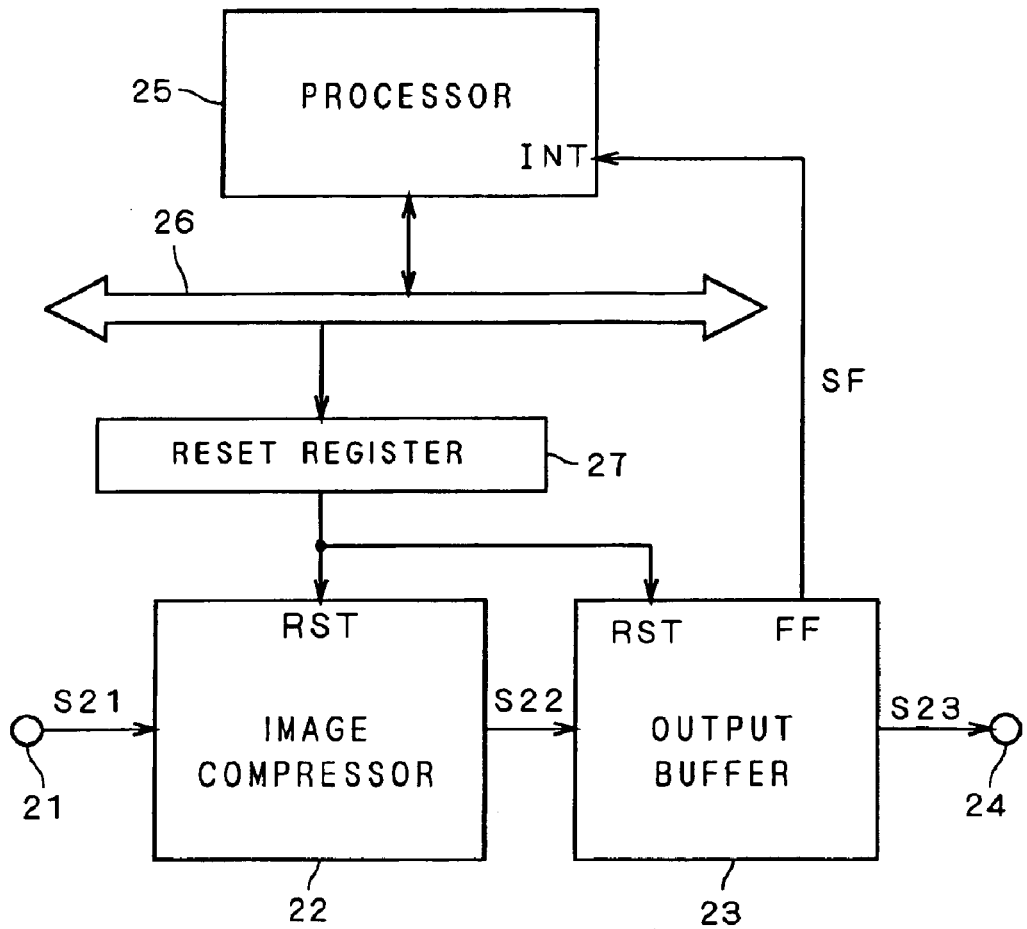
FIG. 20 is a block diagram showing an example of a structure of a conventional image compression coding apparatus.
Figure 21:
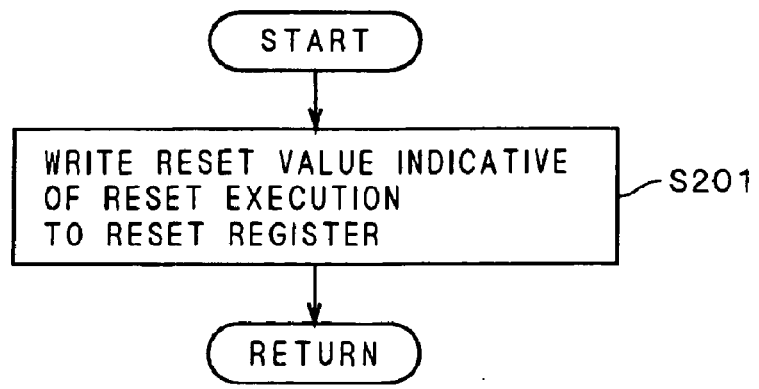
FIG. 21 is a flow chart showing an operation of a processor which is carried out during an overflow according to the conventional art.

FIG. 19 is a flow chart showing a dummy insertion mark detecting operation of the dummy insertion mark detecting section 19.

With reference to FIG. 19, it is decided whether or not a dummy insertion mark is inserted in the output image compression data S3 at Step S121.

If the dummy insertion mark is inserted in the output image compression data S3, the stored value of the selector switching register 17 is set to have the contents indicative of the selection of the dummy stream data S11 at Step S122.

At Step S123, subsequently, the stored value of the selector switching register 17 is set to have the contents indicative of the selection of the output image compression data S3 after a dummy stream data insertion time passes. The dummy stream data insertion time can be properly set based on the coding quantity of the dummy stream data.

On the other hand, if it is decided that the dummy insertion mark is not inserted at the Step S121, anything is not executed but the processing returns to the Step S121.

By the dummy insertion mark detecting operation of the dummy insertion mark detecting section 19 according to the eighth embodiment, thus, the stored value of the selector switching register 17 is switched to have the contents indicative of the selection of the dummy stream data S11 until the dummy stream data insertion time passes after the detection of the dummy insertion mark. Consequently, it is possible to output, from the selector 12, the selected image compression data S12 having the dummy stream data S11 inserted therein in place of the dummy insertion mark in the output image compression data S3.

In the same manner as in the fifth embodiment, consequently, it is possible to eliminate such a drawback that the total number of pictures is changed.

<Others>

While the structure in which the output buffer 3a and the overflow detector 30 are provided in the output buffer section 3 has been described in each of the embodiments, it is also possible to employ a structure in which the overflow detector 30 is provided on the outside of the output buffer section 3 and the overflow of the output buffer 3a is detected at the outside of the output buffer section 3.

In the first embodiment having the structure shown in FIG. 1, for example, an LSI may be constituted by the image compressor 2A, the picture top detector 7A and the overflow detector 30, and the output buffer 3a may be constituted by another LSI (a DRAM or the like).

While the invention has been shown and described in detail, the foregoing description is in all aspects illustrative and not restrictive. It is therefore understood that numerous modifications and variations can be devised without departing from the scope of the invention.

What is claimed is:

1. An image compression coding apparatus comprising:
    an image compressor for compressing input image data and to output image compression data constituted by a plurality of subdivided data;
    an overflow detector for detecting that an output buffer for temporarily storing data generates an overflow or not;
    a subdivided data top detector connected to said image compressor and said output buffer, for serving to carry out a normal operation for exactly giving said image compression data to said output buffer and a detecting operation for detecting a top position of said subdivided data from said image compression data to give said image compression data to said output buffer from said subdivided data of which top position is detected; and
    control means connected such that a result of detection of said overflow detector can be recognized, for serving to cause said subdivided data top detector to execute said detecting operation when an overflow is detected by said overflow detector and to set, as a value of a register indicative of a write destination of said output buffer, an address where a top of said subdivided data a part of which cannot be written to said output buffer is written.

2. The image compression coding apparatus according to claim 1, wherein
    said subdivided data include a picture to be a processing unit treated by an MPEG,
    said subdivided data top detector includes a picture top detector for giving said image compression data, to said output buffer, from a picture of which top position is first detected during said detecting operation.

3. The image compression coding apparatus according to claim 1, wherein
    said subdivided data include a picture to be a processing unit treated by an MPEG,
    said subdivided data top detector includes a picture top detector for giving said image compression data, to said output buffer, from a picture of which top position is detected at a predetermined numbered time which is two or more in a first mode, and giving said image compression data, to said output buffer, from a picture of which top position is first detected in a second mode during said detecting operation.

4. The image compression coding apparatus according to claim 3, wherein
    said control means sets said first mode if a picture type of an overflow picture to be said picture which cannot be written to said output buffer during said overflow is a predetermined type, and sets said second mode if not so.

5. The image compression coding apparatus according to claim 4, wherein
    said predetermined type includes a P picture.

6. The image compression coding apparatus according to claim 5, wherein
    said predetermined type includes an I picture.

7. The image compression coding apparatus according to claim 1, wherein
    said subdivided data include a slice to be a processing unit treated by an MPEG which is obtained by further subdividing a picture,
    said subdivided data top detector includes a slice top detector for detecting a top position of said slice from said image compression data and for giving said image compression data, to said output buffer, from said slice of which top position is detected.

8. The image compression coding apparatus according to claim 1, further comprising:
    a dummy data inserting section provided between said subdivided data top detector and said output buffer and operated under control of said control means and said subdivided data top detector,
    said dummy data inserting section serving to insert dummy data in said image compression data in place of said subdivided data which cannot be written to said output buffer during said overflow.

9. The image compression coding apparatus according to claim 1, further comprising is a dummy data inserting section for receiving said output image compression data and being operated under control of said control means, wherein
    said subdivided data top detector includes a subdivided data top detector for inserting a dummy insertion mark in said image compression data during said detecting operation,
    said dummy data inserting section serves to insert dummy data in place of said dummy insertion mark in said output image compression data.

10. The image compression coding apparatus according to claim 8, wherein
    said image compressor generates a generation coding quantity to be a bit quantity during compression coding, and
    said control means normally executes rate control for controlling a coding quantity of said image compressor based on said generation coding quantity generated by said image compressor and executes said rate control based on a data volume of said dummy data during an overflow.

11. An image compression coding method using an image compression coding apparatus comprising an image compressor for compressing input image data into a subdivided data unit and for outputting image compression data, and an output buffer for temporarily storing said image compression data and for outputting said image compression data as output image compression data in a first-in first-out method while changing a write address, said method comprising the steps of:

(a) returning said write address to an address where said subdivided data which cannot be written to said output buffer during an overflow of said output buffer are to be written when said overflow of said output buffer is generated; and (b) detecting a top position of said subdivided data from said image compression data without giving said image compression data to said output buffer when said overflow of said output buffer is generated, and giving said image compression data again, to said output buffer, from said subdivided data of which top position is detected.

12. The image compression coding method according to claim 11, wherein said subdivided data include a picture to be a processing unit treated by an MPEG, said step (b) includes the step of giving said image compression data, to said output buffer, from a picture of which top position is first detected.

13. The image compression coding method according to claim 11, wherein said subdivided data include a picture to be a processing unit treated by an MPEG, said step (b) including the steps of:

(b-1) giving said image compression data, to said output buffer, from a picture of which top position is detected at a predetermined numbered time which is two or more in a first mode, and (b-2) giving said image compression data, to said output buffer, from a picture of which top position is first detected in a second mode.

14. The image compression coding method according to claim 13, further comprising the step of:

(c) setting said first mode if a picture type of an overflow picture to be said picture which cannot be written to said output buffer during said overflow is a predetermined type, and setting said second mode if not so, said step (c) being executed before said step (b).

15. The image compression coding method according to claim 14, wherein said predetermined type includes a P picture.

16. The image compression coding method according to claim 15, wherein said predetermined type includes an I picture.

17. The image compression coding method according to claim 11, wherein said subdivided data include a slice to be a processing unit treated by an MPEG which is obtained by further subdividing a picture, said step (b) including the step of detecting a top position of said slice from said image compression data and for giving said image compression data, to said output buffer, from said slice of which top position is detected.

18. The image compression coding method according to claim 11, further comprising the step of:

(d) inserting dummy data in said image compression data in place of said subdivided data which cannot be written to said output buffer during said overflow when said overflow is generated, and giving said image compression data to said output buffer.

19. The image compression coding method according to claim 11, wherein said step (b) includes the step of inserting a dummy insertion mark in said image compression data, said method further comprising the step of:

(d) receiving said output image compression data from said output buffer and inserting dummy data in place of a dummy insertion mark in said output image compression data.

20. The image compression coding method according to claim 18, further comprising the steps of:

(e) normally controlling a generation coding quantity to be a bit quantity generated during compression coding in said image compressor, thereby executing rate control; and (f) executing said rate control based on a data volume of said dummy data when said overflow is generated.

* * * * *